United States Patent [19]
Colley et al.

[11] Patent Number: 5,367,636
[45] Date of Patent: Nov. 22, 1994

[54] HYPERCUBE PROCESSOR NETWORK IN WHICH THE PROCESSOR INDENTIFICATION NUMBERS OF TWO PROCESSORS CONNECTED TO EACH OTHER THROUGH PORT NUMBER N, VARY ONLY IN THE NTH BIT

[75] Inventors: Stephen R. Colley, Reno, Nev.; Stanley P. Kenoyer, Forest Grove; Doran K. Wilde, Beaverton, both of Oreg.

[73] Assignee: nCUBE Corporation, Foster City, Calif.

[21] Appl. No.: 144,544

[22] Filed: Nov. 1, 1993

Related U.S. Application Data

[63] Continuation of Ser. No. 587,237, Sep. 24, 1990, abandoned.

[51] Int. Cl.$^5$ .................. G06F 13/00; G06F 13/374
[52] U.S. Cl. ............................ 395/200; 395/800; 370/60.1; 370/85.1; 370/85.7; 364/222.2; 364/241.9; 364/242.94; 364/DIG. 1
[58] Field of Search .................. 395/800, 325, 200; 370/60, 60.1, 91, 92, 94.1, 95.1, 85.1, 85.7

[56] References Cited

U.S. PATENT DOCUMENTS

| | | | |
|---|---|---|---|
| 4,644,496 | 2/1987 | Andrews | 395/800 |
| 4,739,475 | 4/1988 | Fiduccia | 395/800 |
| 4,739,476 | 4/1988 | Fiduccia | 895/800 |
| 4,805,091 | 2/1989 | Thiel et al. | 395/800 |
| 4,930,122 | 5/1990 | Takahashi et al. | 870/85.15 |
| 4,949,337 | 8/1990 | Aggers et al. | 370/85.4 |
| 5,001,706 | 3/1991 | Dighe et al. | 370/94.1 |
| 5,129,077 | 7/1992 | Hillis | 395/500 |
| 5,146,606 | 9/1992 | Grondalski | 395/800 |

Primary Examiner—Alyssa H. Bowler
Assistant Examiner—Alpesh M. Shah
Attorney, Agent, or Firm—Owen L. Lamb

[57] ABSTRACT

A parallel processor network comprised of a plurality of nodes, each node including a processor containing a number of I/O ports, and a local memory. Each processor in the network is assigned a unique processor ID (202) such that the processor IDs of two processors connected to each other through port number n, vary only in the nth bit. Input message decoding means (200) and compare logic and message routing logic (204) create a message path through the processor in response to the decoding of an address message packet and remove the message path in response to the decoding of an end of transmission (EOT) Packet. Each address message packet includes a Forward bit used to send a message to a remote destination either within the network or to a foreign network. Each address packet includes Node Address bits that contain the processor ID of the destination node, it the destination node is in the local network. If the destination node is in a foreign network space, the destination node must be directly connected to a node in the local network space. In this case, the Node Address bits contain the processor ID of the local node connected to the destination node. Path creation means in said processor node compares the masked node address with its own processor ID and sends the address packet out the port number corresponding to the bit position of the first difference between the masked node address and its own processor ID, starting at bit n+1, where n is the number of the port on which the message was received.

7 Claims, 14 Drawing Sheets

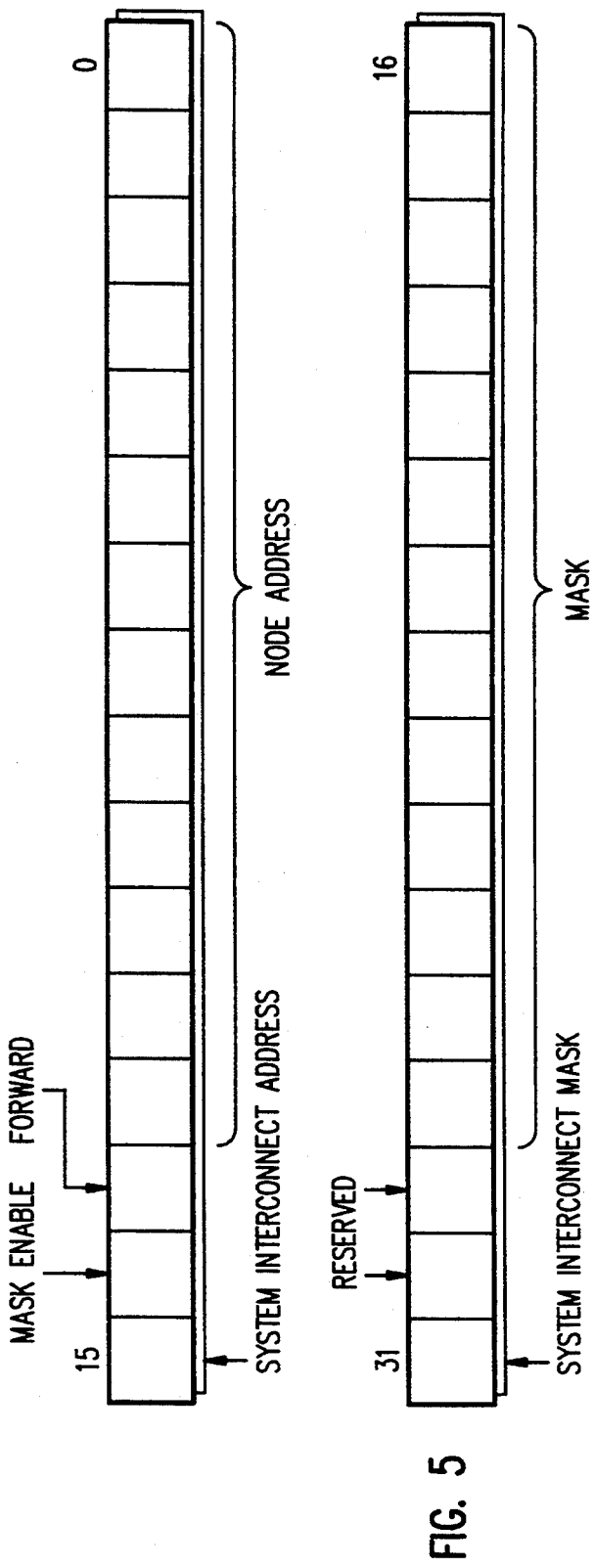
FIG. 5
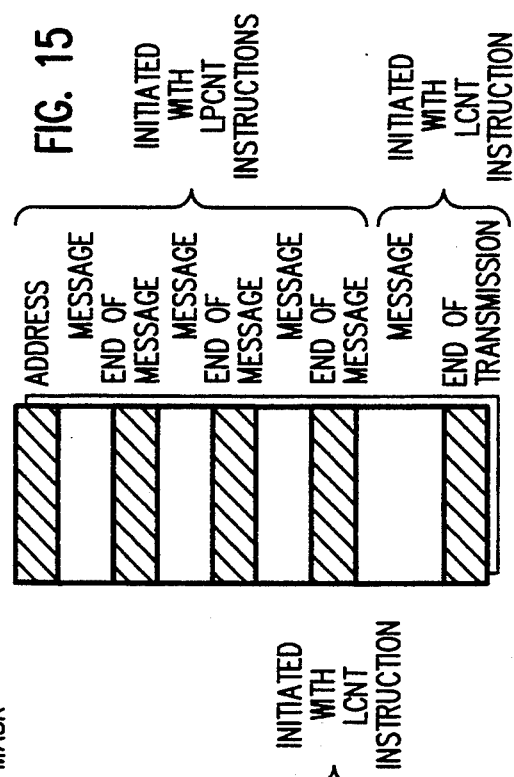
FIG. 15
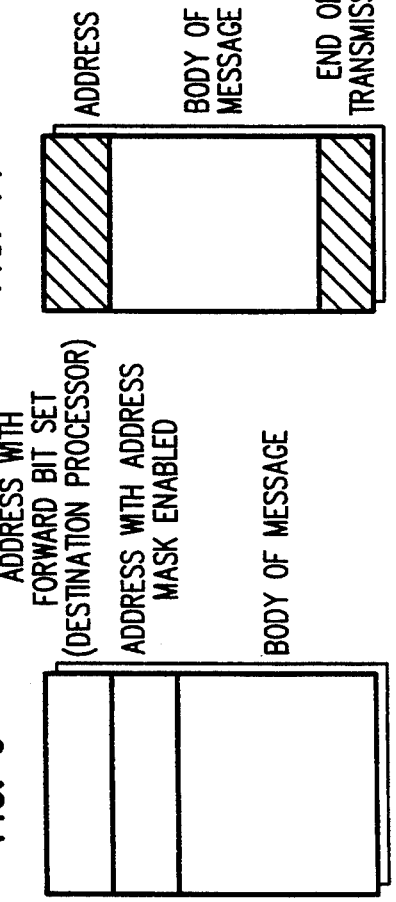
FIG. 14
FIG. 6

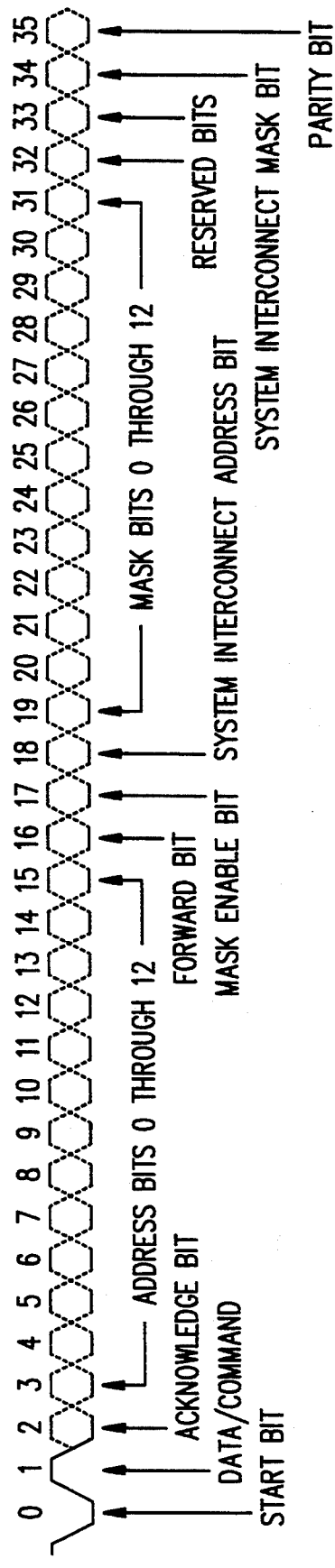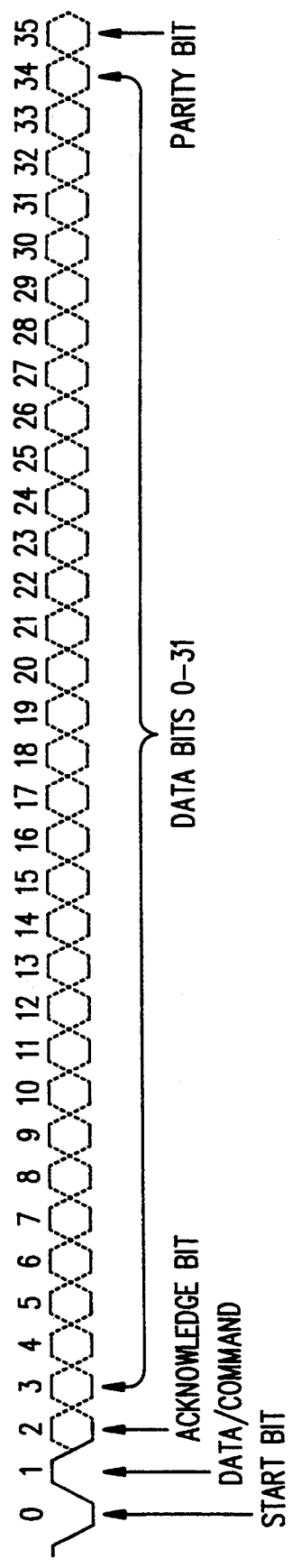

- START BIT
- DATA/COMMAND BIT
- ACKNOWLEDGE BIT
- COMMAND BIT
- PARITY BIT

- START BIT
- DATA/COMMAND BIT
- ACKNOWLEDGE BIT
- COMMAND BIT
- PARITY BIT

- START BIT
- DATA/COMMAND BIT
- ACKNOWLEDGE BIT
- COMMAND BIT
- PARITY BIT

| | INPUT AND OUTPUT MESSAGE READY | INPUT AND OUTPUT TRANSMISSION READY |
|---|---|---|
| ADDRESS | 0 | 0 |
| MESSAGE | 0 | 0 |
| EOM | 1 | 0 |
| MESSAGE | 0 | 0 |
| EOM | 1 | 0 |
| MESSAGE | 0 | 0 |
| EOM | 1 | 0 |
| MESSAGE | 0 | 0 |
| EOT | 1 | 1 |

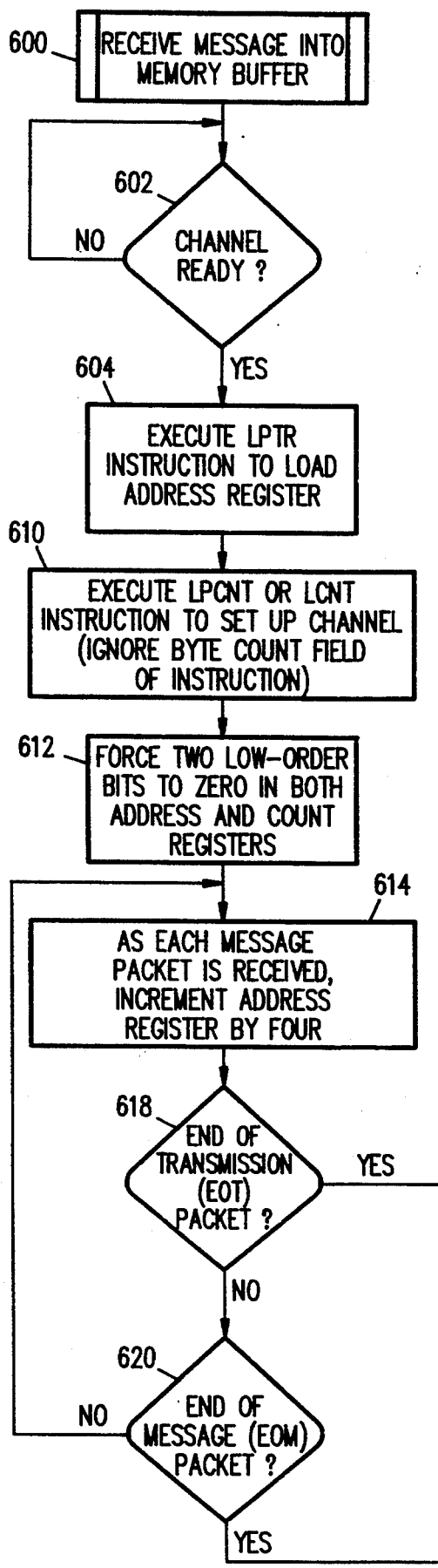
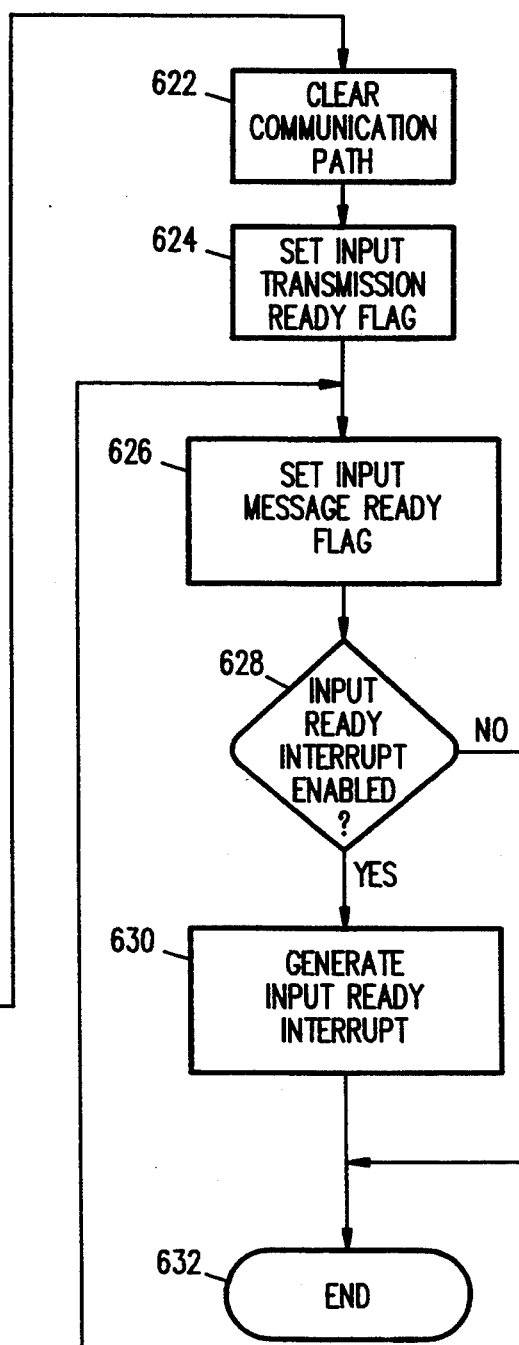
FIG. 21

HYPERCUBE PROCESSOR NETWORK IN WHICH THE PROCESSOR INDENTIFICATION NUMBERS OF TWO PROCESSORS CONNECTED TO EACH OTHER THROUGH PORT NUMBER N, VARY ONLY IN THE NTH BIT this is a continuation of Ser. No. 07/587,237, filed Sep. 24, 1990, now abandoned.

CROSS-REFERENCE TO RELATED APPLICATION

U.S. Pat. No. 5,113,523 entitled "High Performance Computer System" of Stephen R. Colley, et al., granted on May 12, 1992, assigned to Ncube Corporation, and incorporated herein by reference.

BACKGROUND OF THE INVENTION

1. Field of the Invention

The invention relates to data-processing systems, and more particularly, to a communication mechanism for use in a high-performance, parallel-processing system.

2. Description of the Prior Art

The above-referenced U.S. Pat. No. 5,113,523, describes a parallel processor comprised of a plurality of processing nodes, each node including a processor and a memory. Each processor includes means for executing instructions, logic means connected to the memory for interfacing the processor with the memory and means for internode communication. The internode communication means connect the nodes to form a first array of order n having a hypercube topology. A second array of order n having nodes connected together in a hypercube topology is interconnected with the first array to form an order n+1 array. The order n+1 array is made up of the first and second arrays of order n, such that a parallel processor system may be structured with any number of processors that is a power of two. A set of I/O processors are connected to the nodes of the arrays by means of I/O channels. The means for internode communication comprises a serial data channel driven by a clock that is common to all of the nodes.

In U.S. Pat. No. 4,729,095 of Colley et al granted Mar. 1, 1988 and assigned to Ncube Corporation, there is described a broadcast pointer instruction having a source operand which is the address in memory of a message to be broadcast to a number of processors. The broadcast pointer instruction also includes a destination operated which is a multibit mask. A mask register is connected to output channel registers such that every bit position in the mask register that is set to a predetermined value will allow the corresponding output channel address register to be loaded. Decoding means load the mask register with the mask bits of the destination operand of the broadcast pointer instruction. A broadcast count instruction is provided including a source operand which is a plural bit integer equal to the number of bytes in the message. The broadcast count instruction includes a destination operand which is a multibit mask. As transmission progresses, the address register is incremented and the count is decremented by the number of bytes transferred.

The prior art apparatus requires software controls to set up data paths, route data to nodes over the paths created, and remove paths that are no longer in service, It is a primary object of the present invention to provide a new communication mechanism for use in parallel processing system that will provide for communication path creation, data transmission over the created path, and path removal without the need for an external control.

SUMMARY OF THE INVENTION

Briefly, the above object is accomplished in accordance with an embodiment of the present invention as follows.

Each node in a network of interconnected nodes includes a processor and a plurality of communication ports. Each of the processors in the network is assigned a unique processor identification (ID), with the processor IDs of two processors connected to each other through port number n, varying only in the nth bit. A plurality of input ports and a plurality of output ports are provided at each node. Control means at one of the input ports of the node receives address packets related to a current message from an output port of another of the nodes. A data bus connects the input and output ports of the node together such that messages received on any one input port can be routed to any other output port. A compare logic compares a node address in a first address packet with the processor ID of the node to determine the bit position of the first difference between the node address in the first address packet with the processor ID of the node. The compare logic includes means for activating for transmission of the message packet placed on the data bus by the input port, the one of the plurality of output ports whose port number corresponds to the bit position of the first difference, starting at bit n+1, where n is the number of the port on which the message was received.

In accordance with an aspect of the invention, the processor includes a local memory having a memory data bus for receiving data to be stored in the memory, with the output ports being connected to the memory data bus. The compare logic includes means for transferring the messages to the local memory of the node upon the condition that the node address in the first address packet and the processor ID of the node are the same.

In accordance with another aspect of the invention, the compare logic includes blocking means for blocking, at the node, message packets unrelated to the current message packets that specify the same port as the current message packet; and, means are provided for generating an end of transmission (EOT) signal upon receipt of an end of transmission (EOT) message. The compare logic includes means responsive to the end of transmission (EOT) signal for deactivating the blocking means.

In accordance with a further aspect of the invention, the current address packet includes a forward bit capable of being set to a first state and a second state, the current address packet being immediately followed by a next address packet. Means are provide for examining the forward bit to determine if the forward bit is set to the first state, and if it is, and the address in the first address packet and the processor ID are the same, and the address matches the PID, for discarding the address packet in the received message. The compare logic includes means for comparing the node address in the next address packet following the discarded current address packet with the processor ID of the node to determine the bit position of the first difference between the node address in the address packet with the processor ID of the node; and for sending the next address packet out the port number of the node corresponding to the bit position of the first difference, starting at bit n+1, where n is the number of the port on which the message was received.

The invention has the advantage that direct interconnection of I/O ports eliminates off-chip88 communication logic.

The invention has the advantage that automatic cut-through message routing allows messages to pass through intermediate nodes without interrupting the central processing units (CPUs) of intermediate nodes.

The invention has the advantage that automatic message forwarding allows communication between remote cube spaces, and arbitrary message path routing.

The invention has the advantage that automatic disposal of messages having illegal addresses prevents gridlock, by removing dead-end message paths.

BRIEF DESCRIPTION OF THE DRAWINGS

The foregoing and other objects, features, and advantages of the invention will be apparent from the following detailed description of a preferred embodiment of the invention, as illustrated in the accompanying drawings wherein:

FIG. 5 illustrates the format of the 32 bit long address word;

FIG. 6 illustrates the format of a remote broadcast message;

FIG. 8 illustrates the format of an address packet;

FIG. 9 illustrates the format of a data packet;

FIG. 14 illustrates a transmission consisting of a single message is initiated with the LCNT instruction;

FIG. 15 illustrates a transmission consisting of multiple messages is initiated with the LPCNT instruction;

FIG. 21 is a flow diagram of a receive message subroutine.

DESCRIPTION OF THE PREFERRED EMBODIMENT

Figure 1:
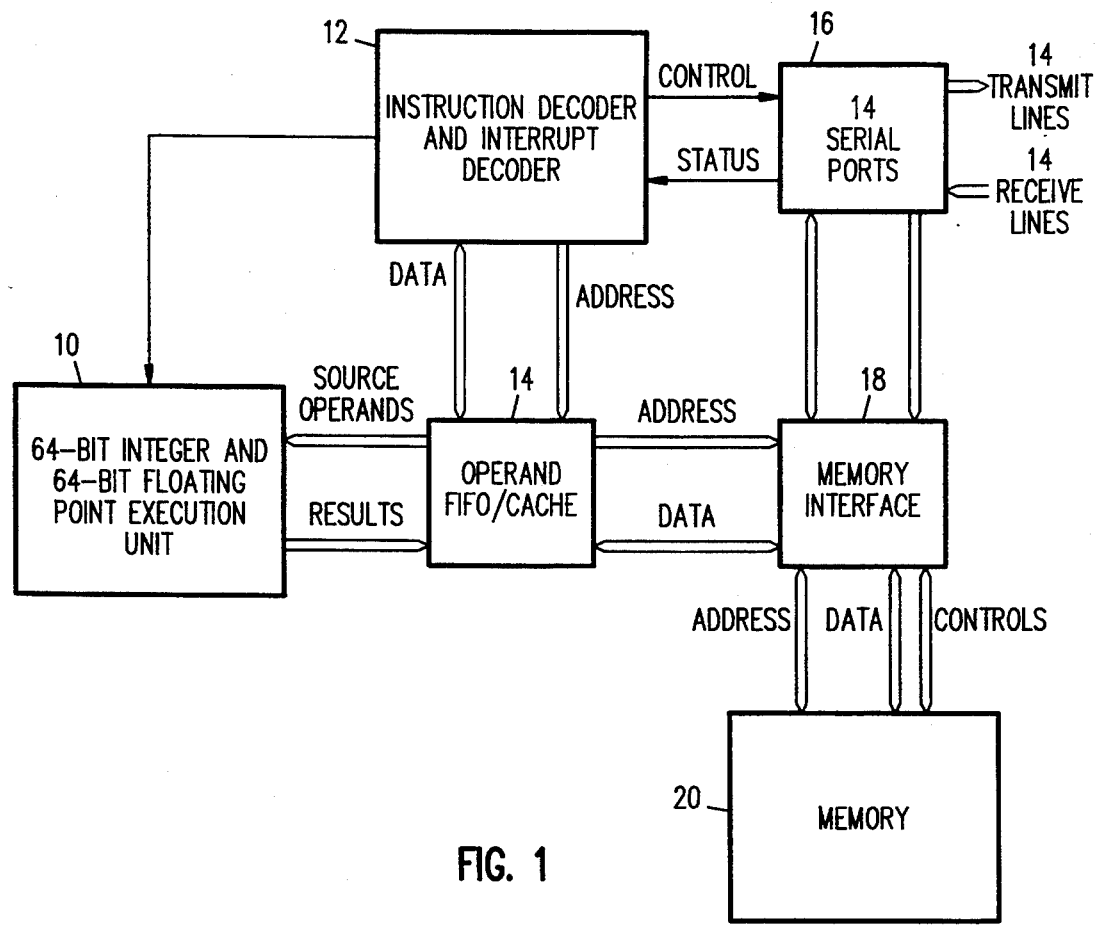
FIG. 1 is a detailed block diagram of a processor in which the present invention is embodied.

Communication between processors is accomplished via messages. Message transmission proceeds in three stages: Path Creation, Data Transmission, and Path Removal. Each stage is performed in turn by each processor in the message path. To accomplish this, three architectural layers are provided, the Interconnect Layer, the Routing Layer, and the Message Layer.

Interconnect Layer

The Interconnect Layer provides the hardware required for establishing physical communication links. The following list describes major features of the Interconnect Layer:

28 independent serial Direct Memory Access (DMA) channels provide 14 full-duplex I/O ports, allowing systems to be designed with up to a dimension 13 hypercube (8,192 processors).

Direct interconnection of I/O ports eliminates off-chip communication logic.

Variable communication speed of I/O ports allows matching the port speed to the signal propagation time of the interconnect. This provides the ability to support very large configurations, while allowing higher communication rates on interconnects having shorter propagation delays.

Intersystem communication with remote hypercube spaces through the System Interconnect (SI) I/O port, allows hypercubes to be networked with each other, as well as with other systems.

Routing Layer

The Routing Layer provides the arbitration and switching logic for creating, maintaining, and removing communication paths between processors in the network. The following list describes major features of the Routing Layer:

Automatic cut-through message routing allows messages to pass through intermediate nodes without interrupting the intermediate node CPUs.

Automatic message broadcasting allows messages to be broadcast to remote subcubes.

Automatic message forwarding allows communication between remote cube spaces, and arbitrary message routing.

Automatic disposal of messages having illegal addresses prevents gridlock, by re-moving dead-end message paths.

Automatic overrun control, via internode handshaking, allows reliable message traffic through intermediate nodes across interconnects of differing speeds.

Message Layer

The Message Layer provides the services for reliable and efficient point-to-point data transfer between processors. The following list describes major features of the Message Layer:

Interrupt driven communications software reduces the load on the CPU.

Messages are automatically broken into discrete packets during transmission automatically reconstructed upon receipt.

DMA capability allows concurrent message transmission independent of CPU activity.

Message transmission without path removal allows sending noncontiguous data.

Automatic error detection allows a target node to respond to errors without interrupting the CPUs of intermediate nodes.

Messages

A message can be visualized as a chain of packets being relayed from processor to processor. The first packet contains an address that the Routing Layer uses to determine which port or ports to use in creating the next link or links in the path. The Routing Layer also uses the address to determine whether to notify the CPU of message arrival. Complex tree-structured and multi-node paths can be created using broadcasting and forwarding techniques.

The channels that the address packet passes through as it moves from processor node to processor node are automatically reserved for the data packets that follow the address packet. The system is able to buffer up to two packets on each incoming channel. The system will request another packet a soon as it has space for it, until an End of Transmission (EOT) packet arrives. As an EOT packet passes through a channel, it causes the processors to release the channel for use by other messages.

A short message of a few packets could be stored entirely within channel buffers of intermediate processors in the path, prior to the address packet reaching the destination processor.

Any transmission errors detected by the intermediate processors are encoded in the packets as they pass through. The transmission errors are then detected by the destination processor.

The Interconnect Layer

The processor in which the present invention is embodied is shown in FIG. 1, and is comprised of Floating Point Execution Unit (40), Instruction Decoder and interrupt decoder (12), operand FIFO cache (14), 14 serial Ports (16), and Memory Interface (18) which is attached to memory (20). Each of the 14 serial ports (16) is an independent Direct Memory Access (DMA) channel. Each I/O channel can be connected directly to a corresponding channel in another processor, thus eliminating the need for off-chip communication logic.

Figure 2:
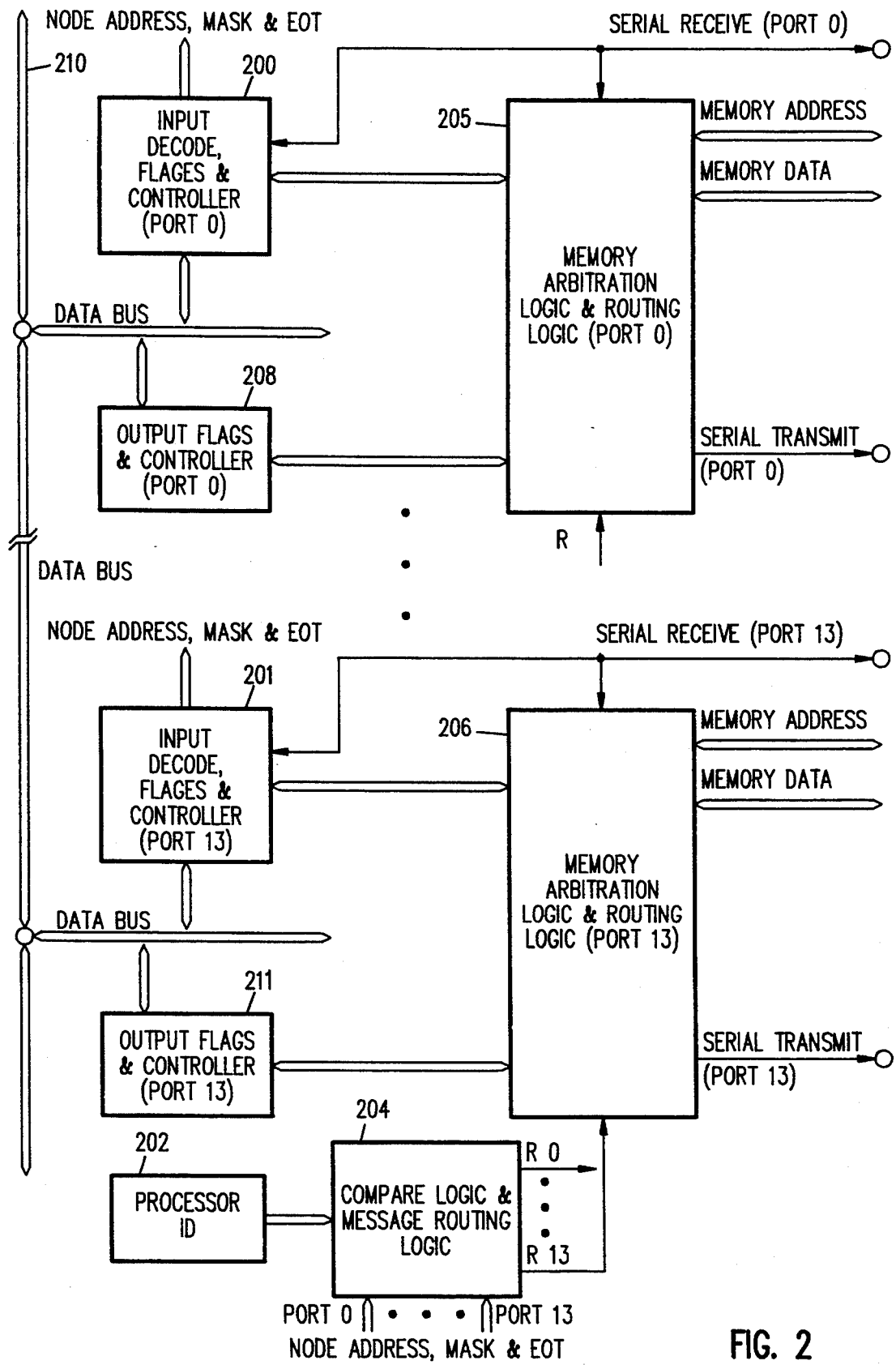
FIG. 2 is a block diagram of the 14 serial ports of the processor shown in FIG. 1.

Refer now to FIG. 2 which is a block diagram of the 14 serial Communication Ports (16) shown in FIG. 1. 28 DMA I/O channels are arranged in pairs. Fourteen channels handle input and fourteen channels handle output, providing fourteen full-duplex I/O ports. This provides full support for system designs with up to a dimension 13 hypercube (8,192 processors), while allowing all processors direct I/O connection with processors outside the hypercube array.

The DMA I/O channels operate independently of the CPU. A DMA channel begins functioning whenever its DMA Count Register is set to a nonzero value. If the address value in the DMA Address Register is larger than the memory space, the high-order bits are ignored. All ports are general, except that one input channel and one output channel, together called the System Interconnect (SI) port, are normally used to communicate with other hypercube spaces or foreign (non-hypercube) systems.

Each of the processors in the network is assigned a unique processor identification (ID), stored in ID register (202), with the processor IDs of two processors connected to each other through port number n, varying only in the nth bit. The input decoder block (200) receives address packets related to a current message from an output port of another of the nodes. A data bus (210) connects the input and output ports of the node together such that messages received on any one input port, such as port 1, can be routed to any other output port, such as port 14. A compare logic (204) compares a node address in a first address packet with the processor ID (202) of the node to determine the bit position of the first difference between the node address in the first address packet with the processor ID of the node. The compare logic includes means for activating for transmission of the message packet placed on the data bus (210) by the input port, the one of the plurality of output ports whose port number corresponds to the bit position of the first difference, starting at bit n+1, where n is the number of the port on which the message was received.

The memory arbitration logic (205, 206) of each port is connected to the memory data bus for storing data in the local memory. The compare logic (204) includes means for transferring the messages to the local memory of the node upon the condition that the node address in the first address packet and the processor ID (203) of the node are the same.

The compare logic (204) also includes blocking means for blocking, at the node, message packets unrelated to the current message packets that specify the same port as the current message packet. Means are provided for generating an end of transmission (EOT) signal upon receipt of an end of transmission (EOT) message. The compare logic includes means responsive to the end of transmission (EOT) signal for deactivating the blocking means.

The current address packet, shown in FIG. 5, includes a forward bit capable of being set to a first state and a second state, the current address packet being immediately followed by a next address packet as shown in FIG. 6. Means are provide for examining the forward bit to determine if the forward bit is set to the first state, and if it is, and the address in the first address packet and the processor ID are the same, and the address matches the PID, for discarding the address packet in the received message. The compare logic includes means for comparing the node address in the next address packet following the discarded current address packet with the processor ID of the node to determine the bit position of the first difference between the node address in the address packet with the processor ID of the node; and for sending the next address packet out the port number of the node corresponding to the bit position of the first difference, starting at bit n+1, where n is the number of the port on which the message was received.

Figure 3A:
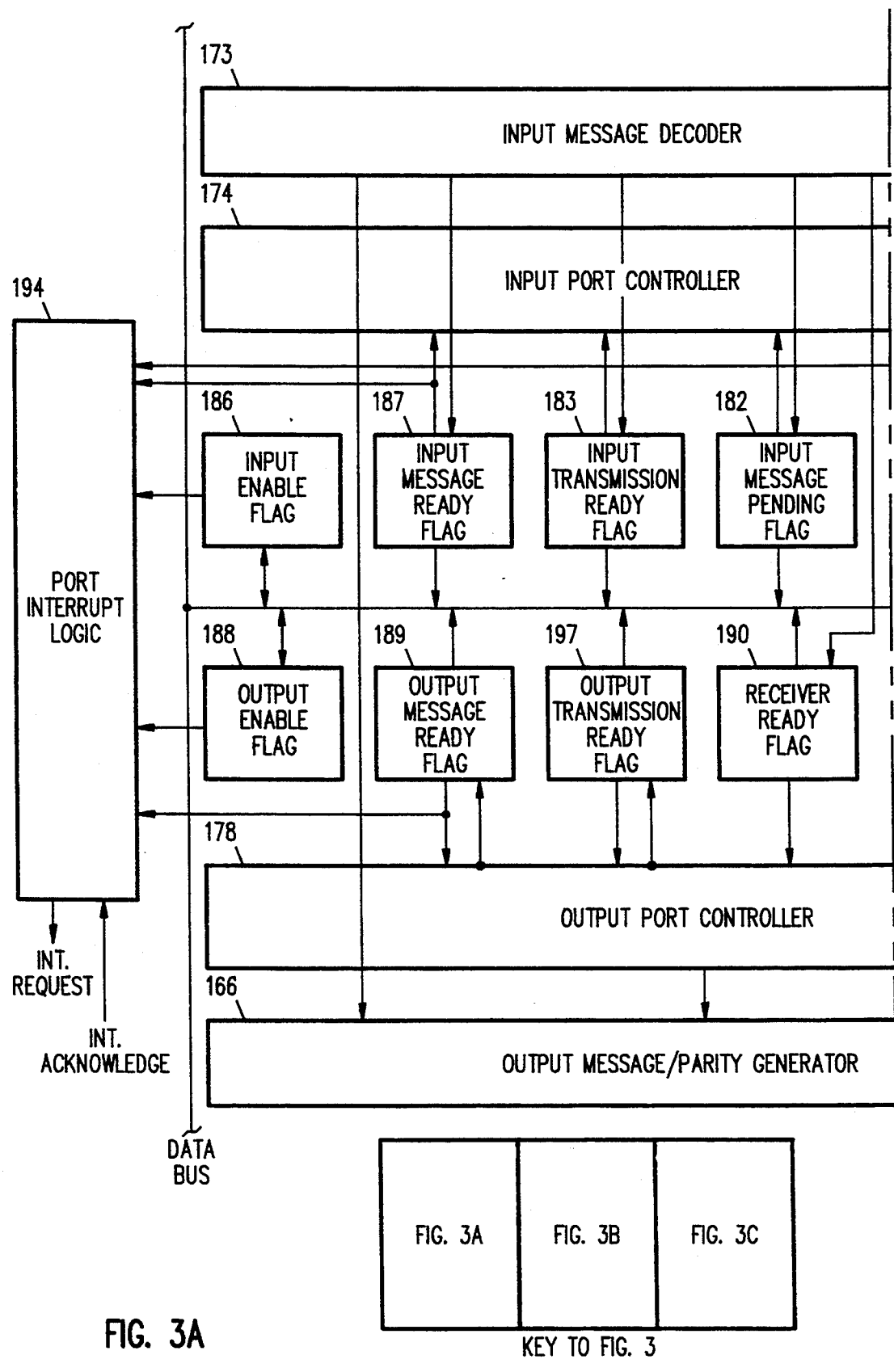
FIGS. 3A, 3B and 3C comprise a composite block diagram of a single serial port representative of one of the 14 serial ports (16) on the processor shown in FIG. 1.
Figure 3B:
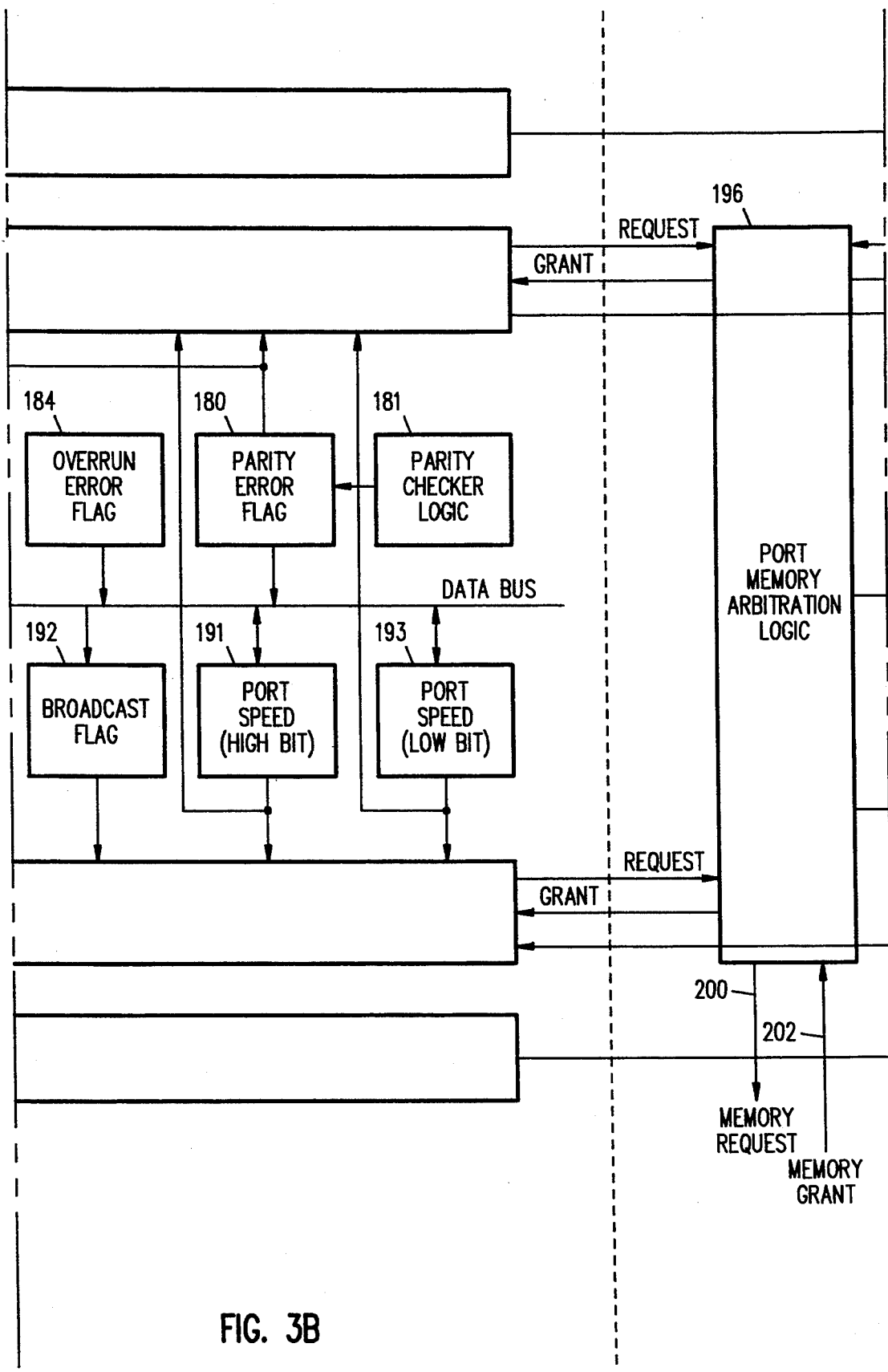
Figure 3C:
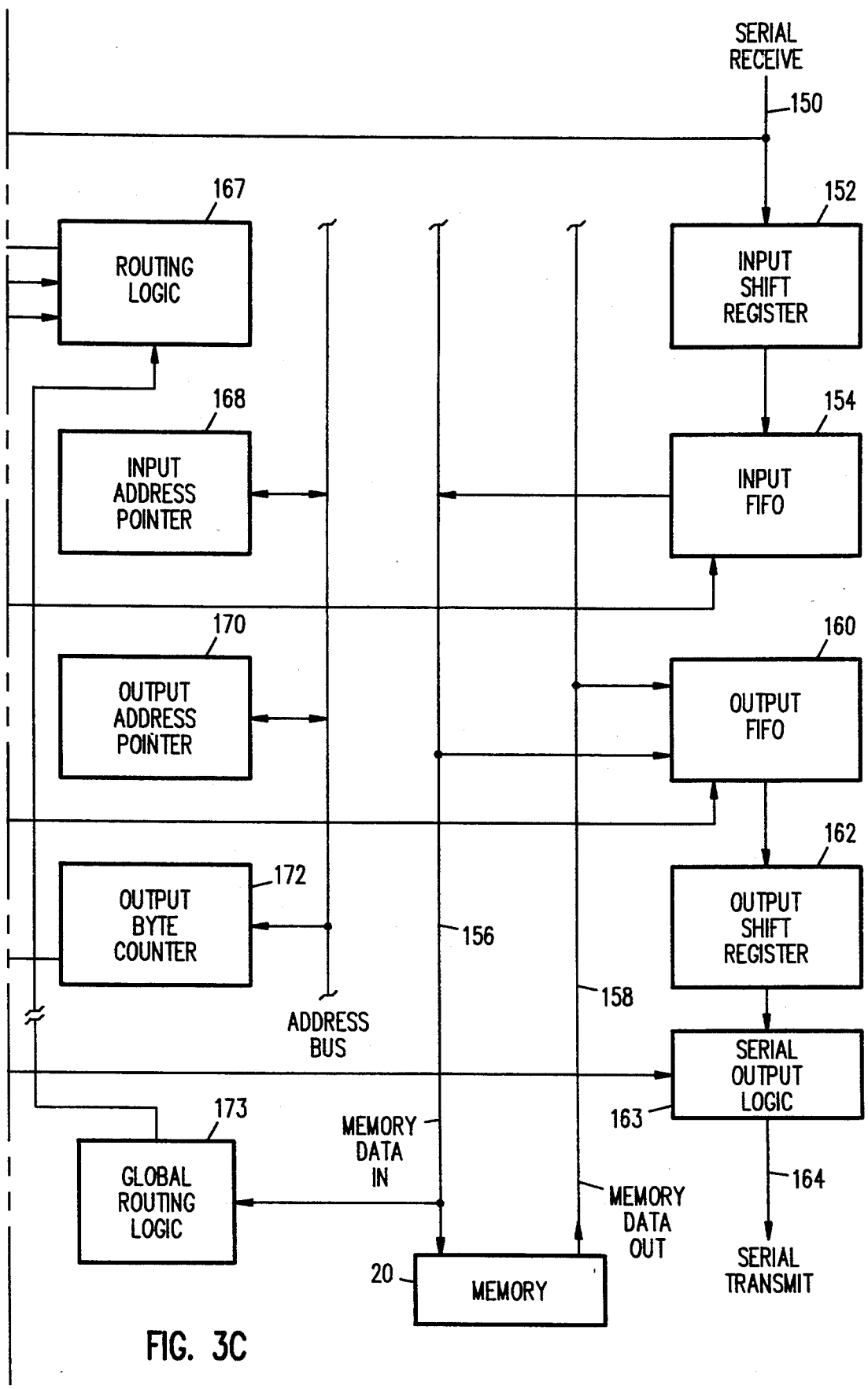

FIGS. 3A and 3B comprise a composite block diagram of a single serial port representative of one of the 14 serial ports (16) on the processor shown in FIG. 1. The address pointers (168, 170) each contain a pointer to the location in memory (20) of the least significant byte of the next word to be transferred. In an output port, the data is moved from memory (20) over the serial transmit interface (164) via 158, 160, 162. In an input port, the data that has been received over the serial receive interface (150) from the output port of the sending processor is moved to memory (20) via 152, 154, 156.

Each port has all the circuitry necessary to both receive and transmit serial messages in full duplex. The format of the messages is described in Section 5.4.1 of the above-identified Colley, et al. application. Data are received on the serial receive line (150) and are framed in the input shift register (152). The information is then transferred in parallel to the input FIFO (154) and is stored there until it is transferred to the memory (20) on the memory data in lines (156). Similarly, data to be transmitted is brought in from the memory data out lines (158) and stored in the output FIFO (160). From there it is transferred to the output shift register (162), and transmitted serially on the serial transmit line (164) after being combined with a parity bit from the parity-bit generator (166).

The output byte counter (172) specifies the length of message to be sent. All of the above-described registers are initialized by the appropriate instruction: the load address pointer instruction, the load byte counter instruction for single channel transfer, and the broadcast count instruction for multiple channel transfer, as described in U.S. Pat. No. 4,729,095. After a message packet is received, the input address pointer (168) is incremented by 4. After a message packet has been sent, the output address pointer (170) is incremented by 4 and the output byte counter (172) is decremented by 4.

There is an input port controller (174) and an output controller (178) which control the timing of the serial transmission. These controllers control the timing of when the parity bit is sent out and when the parity bit is to be checked on incoming data. They also control the various flags. The parity error flag (180) is set by the input controller when there is a parity error detected on an input message by parity check logic (181). The input message pending flag (182) is set by the input controller during the time that the input FIFO (154) is buffering a message which has not yet been transferred into memory. The overrun error flag (184) is never in an asserted state since the sender (controlled by 178) only sends data when the receiver ready flag (190) is set as signalled by ACK. The input enable flag (186) is a flag which is both readable and writable by the user to enable interrupts that occur when the input port becomes ready and the input message ready flag (187) is set. The input message ready flag (187) is set in response to receipt of an End of Message or End of Transmission packet.

On the output port there is an output enable flag (188) which, when enabled, will generate an interrupt when the output message ready flag (189) is set, i.e., when the output byte counter (172) goes to zero, signifying that the entire message has been transmitted. This signals the user that it is necessary to reinitialize the port with a new message. The receiver ready flag (190) is set when the connected input port can receive another word (as signalled by ACK). The broadcast flag (192) is initialized by the broadcast count instruction. When this flag is set, it indicates that this particular output port is a member of the current broadcast group. When an output port is a member of the current broadcast group, then any data coming over the memory data out bus (158) for broadcasting will be transmitted out of this port and simultaneously out of all other ports that have their broadcast flags on.

The port interrupt logic (194) generates interrupts if enabled when the input or output ports have finished transmitting or receiving messages, as signaled by the appropriate flag, input enable (186) or output enable (188) being set.

The port memory arbitration logic (196) performs the function of arbitrating for memory with all the other serial ports. The winner of this arbitration must again arbitrate with other units on the chip in the memory interface unit (18) of FIG. 1 as described in Section 8.8 of the above-identified Colley, et al. application. When a port memory arbitration is successful the memory request line (200) is energized. When a memory grant is given, the memory grant line (202) indicates that data either has been taken from the memory data in bus (156) or that the data is available on the memory data out bus (158).

Each output channel has an output address pointer (170), an output byte count register (172), an output message ready flag (189) and an output enable flag (188). Each input channel has a parity error flag (180), an overrun error flag (184) and an input enable flag (186). Besides the enable for each channel there are two global enable flags in the Program Status (PS) register. The global enable (II) flag disables all input interrupts (including errors) even if the corresponding channel flag is enabled and the global enable (IO) flag disables all output interrupts.

In order to send a message from a memory buffer on a single output channel, a processor first either checks the channel's ready flag or enables its interrupt and waits for a "ready" interrupt. As soon as the channel indicates that it is ready (idle), the output address pointer (170) is set to point to the first (low) byte of the message, which must begin on a word boundary. This is accomplished by executing a LPTR (Load Pointer) instruction as described in U.S. Pat. No. 4,729,095. The source (src) operand of this instruction is the address of the message buffer and the destination (des) operand is an integer whose value determines which of the channel registers is to be loaded.

In order to start the automatic message output, the output byte counter (172) must be set to the number of bytes in the message. The two low order bits are forced to zero in both the output address pointer (170) and the output byte counter (172); thus the message buffer must start on a word boundary. This is done by executing a LCNT (Load Count) instruction. The destination operand indicates the register to be loaded as explained above for the LPTR instruction and the source operand is the count value (an unsigned 32 bit integer). The LCNT instruction also resets the parity (181) and overrun error flag (184) when setting up an input port. The message transmission is automatic and as data is sent the output address pointer (170) is incremented and the output byte counter (172) is decremented by the number of bytes transferred. When the output byte count becomes zero the output transmission stops, the output message ready flag (189) is set and, if the output enable flag (188) is set, the ready interrupt is generated.

A channel's Address Register (168, 172) contains a pointer to the least significant byte of the next word to be transferred. If it is an output channel, the data is moved from memory out to the channel. If it is an input channel, the data that has been received is moved to memory. The Count Register (172) in the output channel is set to indicate the number of bytes to be sent. As data are sent, the output channel Address pointer (170) is incremented by the number of bytes transferred, and the Byte Counter (172) is decremented by the number of bytes transferred. When the count reaches zero, an End of Message (EOM) packet or an End of Transmission (EOT) packet is sent to the receiver, the appropriate bit in the Output Message Ready Register or the Output Transmission Ready Register, or both, is set, and an Output Ready interrupt is generated, if enabled. As data is received, the input channel DMA Address Register is incremented by the number of bytes transferred. When an EOM or EOT packet is received, the appropriate bit in the Input Message Ready Register is set to ready, and an Input Ready interrupt, if enabled, is generated by interrupt logic (194).

Channel numbers are used in connection with the LPTR, LCNT, and LPCNT Communication Control instructions to address the channel to be loaded.

The input and output port registers are addressed according to Table I.

TABLE 1

| Use Channel | To Access Input Port | Use Channel | To Access Output Port |
|---|---|---|---|
| 0 | 0 | 32 | 0 |
| 1 | 1 | 33 | 1 |
| 2 | 2 | 34 | 2 |
| 3 | 3 | 35 | 3 |
| 4 | 4 | 36 | 4 |
| 5 | 5 | 37 | 5 |
| 6 | 6 | 38 | 6 |
| 7 | 7 | 39 | 7 |
| 8 | 8 | 40 | 8 |
| 9 | 9 | 41 | 9 |
| 10 | 10 | 42 | 10 |
| 11 | 11 | 43 | 11 |
| 12 | 12 | 44 | 12 |
| 31 | SI | 63 | SI |

Channels 0 through 12 and 31 are input channels. Channels 32 through 44 and 63 are output channels. Ports 0 through 12 are intended for local cube space interconnects in a hypercube communication network. The SI ports communicate with remote cube spaces or foreign systems, allowing hypercubes to be networked with each other and with other systems. Channels 13 to 30 and 45 to 62 are reserved for future expansion.

Each port supports four communication speeds, so that the port speed can be matched to the signal propagation time of the interconnect. This supports very large configurations but also allows higher communication rates on interconnects having shorter propagation delays. Not all ports are required to run at the same speed, but message speed is limited by the rate of the slowest interconnect in the path. The Port Speed Low Register and Port Speed High Register processor registers determine the speed of each port.

Ports that are connected to each other must run at the same speed.

The Routing Layer

The Routing Layer provides the arbitration and switching logic for creating, maintaining, and removing communication paths between processors in the network. In performing these functions, especially path creation, the Routing Layer makes assumptions regarding the interconnect topology and processor addresses (processor IDs). The Routing Layer assumes that each processor in the network has been assigned a unique processor ID during initialization of the hypercube array. The Routing Layer also assumes that the processor IDs of two processors connected to each other through port number N, vary only in the Nth bit.

Figure 4:
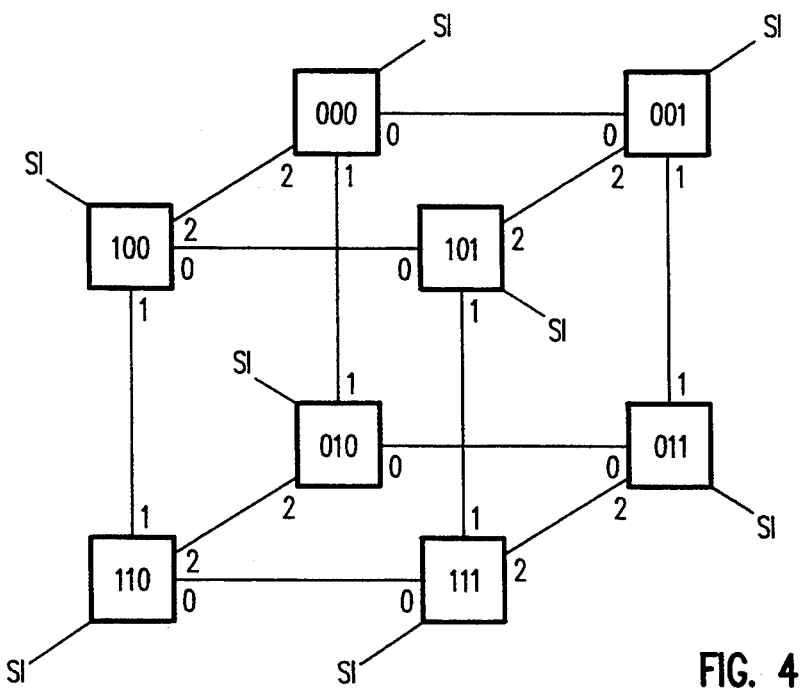
FIG. 4 illustrates the interconnect and address scheme in an eight processor network.

FIG. 4 illustrates the interconnect and address scheme in an eight processor network.

The interconnect is assumed to be a hypercube with processors connected via corresponding I/O ports. The creation and subsequent removal of a message path through the network is performed by the Routing Layer in response to an Address Packet or EOT Packet, respectively.

Address Format

An address packet sets up a path which remains intact until an EOT packet is encountered. FIG. 5 illustrates the format of the 32 bit long address word.

The Forward bit (bit 13) is used to send a message to a remote subcube in either the local cube space, or a foreign cube space.

The Node Address bits (bits 0–12) contain the processor ID of the destination node, if the destination node is in the local cube space. If the destination node is in a foreign cube space, the destination node must be directly connected to a node in the local cube space. In this case, the Node Address bits contain the processor ID of the local node connected to the destination node. The System Interconnect Address (bit 15) specifies whether the destination node is in the local cube space (bit 15=0) or a foreign cube space (bit 15=1).

The Address Mask bits (bits 16–28) make it possible to send a single message to multiple destinations via hardware. A message can be sent to all of the nodes in a subcube of the local hypercube array, to all of the foreign nodes directly connected to a subcube of the local hypercube array, or both. This is possible because an input channel can hardware route messages to more than one output channel. However, an output channel cannot receive messages from more than one input channel at a time.

Table II illustrates how the address and mask bits in an address determine the destination node or nodes.

TABLE II

| Address Bits | | | Destination |
|---|---|---|---|
| 14 | 31 | 15 | |
| 0 | X | 0 | The local array node addressed by bits 0–12 |
| 0 | X | 1 | The System Interconnect node connected to the local array node addressed by bits 0–12 |
| 1 | 0 | 0 | The local array nodes addressed by bits 0–12 (masked by bits 16–28) |
| 1 | 0 | 1 | The System Interconnect nodes connected to the local array nodes addressed by bits 0–12 (masked by bits 16–28) |
| 1 | 1 | X | The local array nodes, and the System Interconnect nodes connected to them, addressed by bits 0–12 (masked by bits 16–28) |

If Mask Enable (bit 14) is set to 1, it enables the Address Mask (bits 16–28) and the System Interconnect Mask (bit 31). Bits 16–28 mask address bits 0–12, and bit 31 masks address bit 15. For every bit set to 0 in Address Mask, the corresponding bit in the destination nodes's processor ID and in Node Address must match. For every bit set to 1 in Address Mask, the corresponding bit in the destination node's processor ID and in Node Address need not match. If bit 31 is set to 1, the message is sent both to the local subcube nodes addressed by Node Address (masked by Address Mask) and to the System Interconnect nodes directly connected to the addressed local nodes.

As an example, suppose the destination node ID contained in the address word is 01010 and the address masking bits are 00101. Then if bit 14 (the Mask Enable bit) is 0, the only node to receive the message is the node with processor ID 01010. If bit 14 is 1, however, all the nodes with processor IDs matching 01x1x receive the message. The mask selects bits in positions 1, 3 and 4 and ignores bits in positions 0 and 2.

A mask of all 1s selects all nodes in the array.

Path Creation

A communication path is established by sending an address packet out a channel. The address is passed from node to node. Each processor compares the masked node address with its own processor ID and sends the address packet out the port number corresponding to the bit position of the first difference, starting at bit n+1, where n is the number of the port on which the message was received.

When using default routing, messages are always sent out on a port which has a number higher than the port on which the message was received.

An established routing path blocks any messages that try to use the same channels, until the path is cleared by an EOT packet.

Example of Path Creation

To send a message from node 0000 to node 1011, the following steps take place:

1. User software directs node 0000's processor to send the message out the correct initial port. (The correct initial port is the port which has the same number as the bit position of the first difference between the sending processor's ID, and the receiving processor's ID. In this example, the correct initial port is port 0, because bit 0 of the sending processor's ID is 0, and bit 0 of the receiving processor's ID is 1.)

The node which originates the message must route the message out the port number corresponding to the bit position of the first difference in the processor ID, or the message cannot get to its destination. The message opens a path, but the message is then discarded in order to remove the path. This action does not return an error.

2. The message is sent to node 0001, whose node ID (0001) differs from the sending node (0000) only in the bit (bit 0) indicated by the port number (port 0).
3. Node 0001's processor ID (0001) is compared with the node address (1011) in the address packet.
4. The first difference is found to occur in bit 1.
5. The message is sent out the corresponding port; port 1.
6. The message is sent to node 0011.
7. Node 0011's processor ID is compared with the node address (1011) in the address packet.
8. The first difference is found to occur in bit 3.
9. The message is sent out the corresponding port; port 3.
10. The message is sent to node 1011.
11. Node 1011's processor ID is compared with the node address (1011) in the address packet.
12. The processor IDs are the same, so node 1011 transfers the message to local memory.

To summarize the above example:

| From Node | Out Port | To Node | Out Port | To Node | Out Port | To Node |
|---|---|---|---|---|---|---|
| 0000 | 0 | 0001 | 1 | 0011 | 3 | 1011 |

Transferring a Message to Local Memory

If one of the following sets of conditions is met, a processor will transfer a message to local memory:

- (The Mask Enable bit (bit 14) of the address is 0), and (bits 0–12 of the processor ID match bits 0–12 of the node address) and (bit 31 of the processor ID is 0 and bit 15 of the node address is 0; or bit 31 of the processor ID is 1).
- (The Mask Enable bit of the address is 1) and (the unmasked bits in bits 0–12 of the node address match the cor-responding bits in the processor ID) and (bit 31 of the processor ID is 0 and bit 15 of the node address is 0; or bit 31 of the processor ID is 1).
- The SI (bit 31) of the processor ID is 1 and the address SI bit is 1.
- (The SI (bit 31) of the processor ID is 1) and (the Mask Enable bit of the node address is 1) and (the Mask SI bit is 1).

If the processor ID does not meet one of the sets of conditions listed above, the message is sent to the next node on the path.

Forwarding a Message

Bit 13 in the address word is the Forward bit. If bit 13 is set to 1, the destination processor discards the address packet and treats the next packet as the address. When forwarding, a path can connect to a port which has a number lower than the port the address packet came in on, in contrast to default routing.

Forwarding is used to communicate between remote cube spaces and to create arbitrary paths to specific nodes. If the following conditions are met, the processor will forward a message:

An SI processor cannot forward a message to the SI port.

The Forward bit must be 1 and either the message must be from the SI port, or the conditions must be met for transferring a message to local memory, as described in the previous section.

Once the first address packet has been discarded, the processor tests the next address against its own ID, and if the conditions are met for receiving a message, the processor transfers the message to local memory, whether or not the forwarding bit is set in the second address. If the conditions are not met for receiving the message, the processor sends the message to the next node on the path.

The user can forward as many times in one message as desired. Messages must always be forwarded to a valid address.

If the Forward bit is on in an address, the next word in the message must be a valid address. If the next word is not a valid address, the results are not guaranteed and can halt the processor.

Care must be taken to avoid creating a circular path when forwarding. A circular path is an attempt to reuse a communication link that has already been allocated for a previous segment of the path being created. A circular path will cause deadlock. It is always safer to use the default routing due to its avoidance of deadlock.

There is no way to remove a deadlocked path except to reset the processors involved.

Messages must be forwarded to a System Interconnect node if the user wants to communicate with cube spaces which are not physically part of the same cube as the originating processor. Note, however, that if a message comes across a System Interconnect port and the forwarding bit is not set to 1, the address is treated as an address in the local cube space, and the results can be inconsistent.

Broadcasting

In addition to the ability to create single-threaded point-to-point message paths between two processors, the communications unit has a powerful broadcast facility. The broadcast facility provides the ability to create complex tree-structured paths for delivery of a message to multiple destinations. The major advantages of broadcasting are a reduction of the memory bandwidth used in transmission, and minimization of the initiation cost.

Two types of broadcasting are supported: local and remote. Local broadcasts are initiated by the CPU via the broadcast instructions, which require the use of a broadcast mask. Remote broadcasts are initiated by the system in response to an address and mask.

Remote broadcasting is an alternative, not a requirement. However, remote broadcasting can minimize the number of open channels when communicating with a subcube that does not include the source node.

As an address packet moves through the network, it causes communications channels to be reserved and linked together. When the address packet reaches a processor, it is duplicated as necessary and sent out the appropriate ports, which become reserved until an EOT packet releases them.

When the mask causes a processor to send the address packet out multiple channels, all of the required channels must be available before the channels will be reserved and the address packet duplicated and sent. If any of the required channels are already allocated to another message path, the creation of the multi-branch message path will be blocked. The more channels a mask selects, the greater the probability that the path creation will be blocked. When the creation of a multi-branch path is blocked, all of the target channels remain available for allocation to other paths that may be created. Therefore, the blockage may persist for an indeterminate length of time. In addition, when a branch of a broadcast tree gets blocked during creation, it can prevent completion of the message transfer to those destination processors to which paths have been successfully created. The delay occurs because each message packet that is received must be transferred to all target ports before the next message packet is accepted. The probability of this occurring, as well as the length of the delay, is directly related to the communication load of the network and the size of the broadcast.

Remote Broadcast: Using Address Forward and Mask

A remote broadcast is accomplished with one or more address packets. A remote broadcast can use address forwarding and must use address masking to cause a message path to "fan out" upon reaching a specified processor. One type of remote broadcast requires at least two address packets. The first address packet contains a forwarding address and has the forward bit set. The last address packet contains the broadcast mask and has the mask enable bit set. Any intermediate address packets also contain a forwarding address and have the forward bit set. FIG. 6 illustrates the format of this type of remote broadcast message.

Any number of forwards can occur prior to the address packet with the address mask enabled. However, the masked address must not have the forwarding bit set.

The result of setting both the forward and mask enable bits is not defined and could lock up the processor.

Examples of Using a Mask to Broadcast

Bit 14 of the address word is the Mask Enable bit. If this bit is set to 0, the address contained in bits 0–12 must match exactly the bits in the destination node's ID. If this bit is set to 1, then the contents of bits 16–28 are used as an address mask for the destination node's ID. For every bit set to 0 in the address mask, the corresponding bit in the destination address must match. For every bit set to 1 in the address mask, the corresponding bit need not match.

The table III illustrates two examples of broadcasting using an address mask. The example addresses are shorter than 13 bits to simplify the examples.

TABLE III

| Destination ID in bits 0–12 | Mask in bits 16–28 | ID of Node Receiving Message if Bit 14 = 0 | IDs of Nodes Receiving Message if Bit 14 = 1 |
|---|---|---|---|
| 11000 | 11001 | 11000 | 00000 |
| | | | 00001 |
| | | | 01000 |
| | | | 01001 |
| | | | 10000 |
| | | | 10001 |
| | | | 11000 |
| | | | 11001 |
| 111111 | 001010 | 111111 | 110101 |
| | | | 110111 |
| | | | 111101 |
| | | | 111111 |

Local Broadcast: Using Broadcast Instructions

As described in U.S. Pat. No. 4,729,095, a local broadcast is accomplished via a single DMA transfer at the originating node. The processor can only handle one local broadcast at a time, so if a subsequent broadcast is attempted before the current one is finished, even if on different channels, the results for both are undefined. However, individual channel communication can be concurrent with a broadcast.

To send a message over several channels at once, the user must ensure that the desired output channels are ready, and then execute a BPTR (Broadcast Pointer) instruction. Its source operand is the address of the message and its destination operand is a 32-bit broadcast mask. Every bit that is set in the broadcast mask causes the corresponding output channel address register to be loaded. Bit position 0 corresponds to output channel 32, position 1 to channel 33, and so on.

The broadcast is started by executing a BCNT (Broadcast Count) instruction whose destination operand is the broadcast mask used for BPTR and whose source operand is an unsigned 32-bit integer equal to the number of bytes in the message. This involves the CPU, but uses a single DMA to supply data to the target ports.

Example of Using the Broadcast Instruction and an Address Mask to Broadcast

Figure 7:
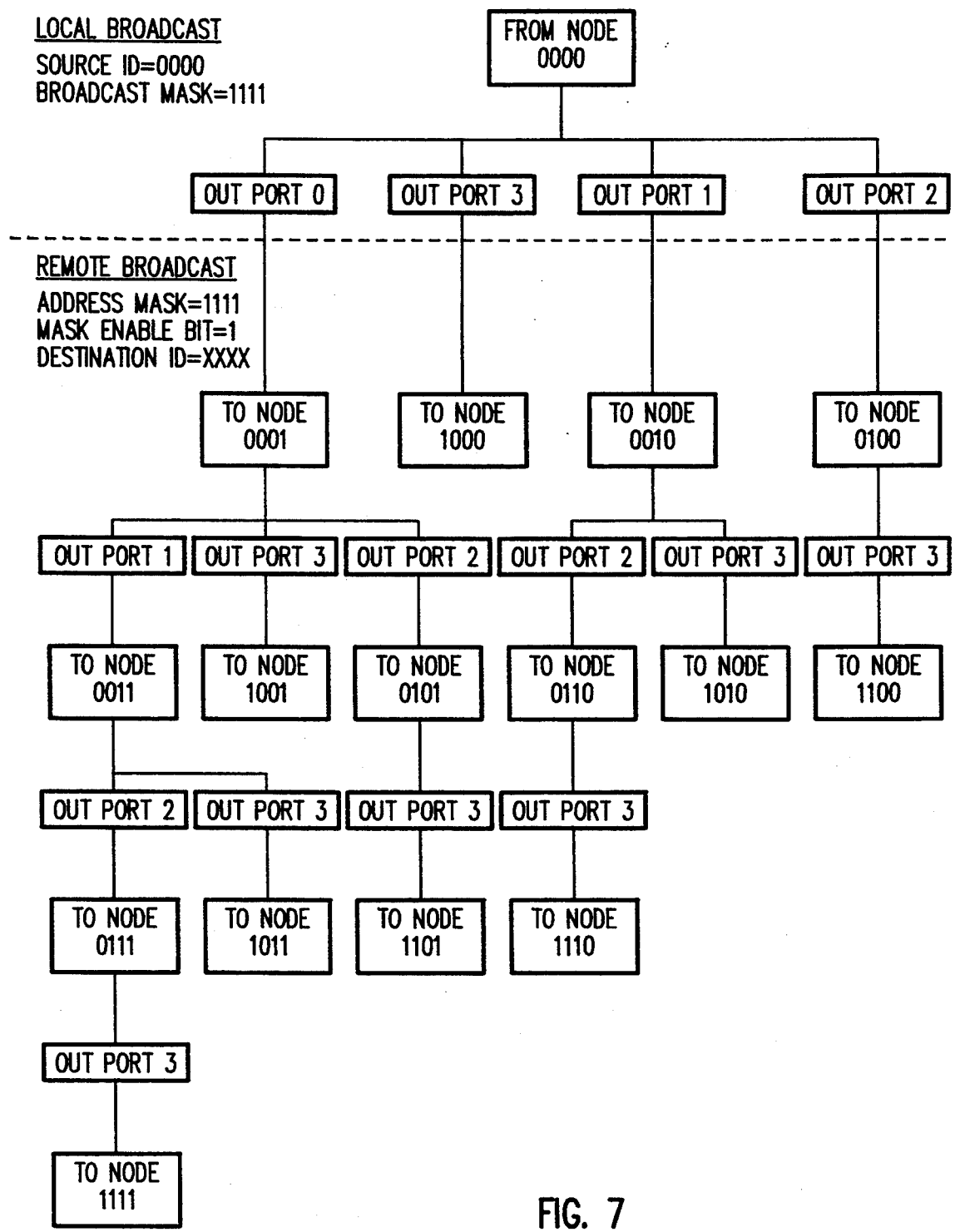
FIG. 7 is an example of how a message is sent from a node address 0000 to a destination node whose address is XXXX.

The full broadcast facility, which consists of a local broadcast combined with a remote broadcast, is the only way a single message can be routed to all the nodes in a subcube if the source node is in the "don't care" group specified by the address mask. FIG. 7 illustrates an example of sending a message to a destination of XXXX from node 0000.

Address Packet Format

FIG. 8 illustrates the format of an address packet. An address packet consists of:
- a start bit: always 0, indicating packet start.
- a data/command bit: always 1 for an address (data) packet
- an acknowledge bit: 1 indicates that the sending processor has received a packet and can accept another packet; 0 indicates that the sending processor cannot accept another packet yet.
- 13 address bits: sent least significant bit first.
- a forward bit: 1 to forward a message; 0 for no forward.
- a mask enable bit: 1 to enable the mask; 0 to disable the mask.
- a System Interconnect bit: 1 to signify that the destination node is an SI node; 0 to signify that the node is an array node.
- 13 node address mask bits: 1 to set the mask bit and put the corresponding node address bit in the "don't care" group; 0 to turn off the mask bit and force a match on the corresponding address bit.
- 2 reserved bits.
- an SI mask bit: System Interconnect (SI) Mask (Refer to Table II).
- a parity bit: all packets have odd parity.

Data Packet Format

FIG. 9 illustrates the format of a data packet. a data packet consists of:
- a start bit: always 0, indicating packet start.
- a data/command bit: always 1 for a data packet.
- an acknowledge bit: 1 indicates that the sending processor has received a packet and can accept another packet; 0 indicates that the sending processor cannot accept another packet yet.
- 32 data bits: sent least significant bit first.
- a parity bit: all packets have odd parity.

Command Packet Format

Figure 10:
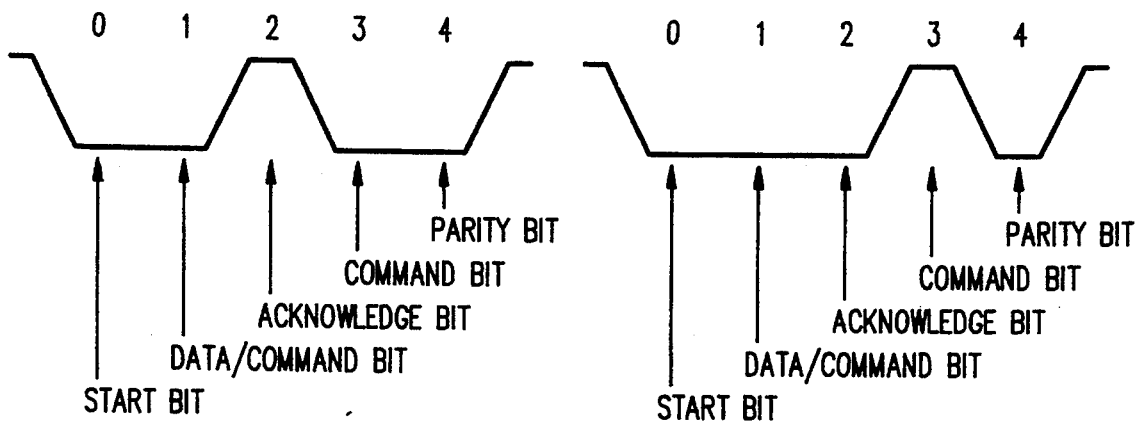
FIG. 10 illustrates the format of an Acknowledge (ACK) command packet.

FIG. 10 illustrates the format of an Acknowledge (ACK) command packet. a command packet consists of:
- a start bit: always 0, indicating packet start.
- a data/command bit: always 0 for a command packet.
- an acknowledge bit: 0 indicates that the EOM/EOT bit has significance; 1 indicates acknowledgment of receipt of a packet, readiness to accept another packet, and that the EOM/EOT bit has no significance.
- a command (End of Message/End of Transmission) bit: 1 for EOM; 0 for EOT; 0 for ACK.
- a parity bit: all packets have odd parity.

An Acknowledge (ACK) command packet is sent back to the source processor upon receipt of a packet, to inform the source that it can now send the next packet. If the acknowledging processor has a data packet to send to the processor it is acknowledging, it can include the acknowledgment with the data packet, rather than sending a separate ACK command packet.

An End of Message (EOM) command packet leaves the communication path set up and sets the bit corresponding to the port number in the Input Message Ready processor register. If an Input Ready interrupt is enabled, it occurs.

Figure 11:
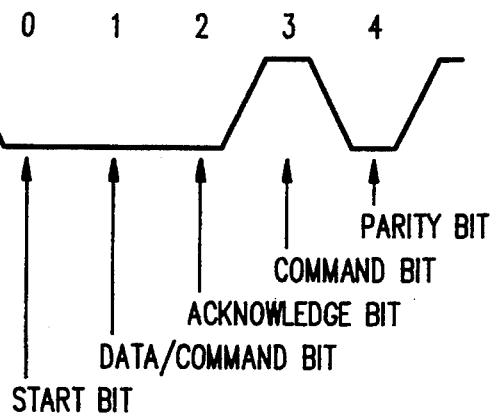
FIG. 11 illustrates the format of an End of Message command packet.

FIG. 11 illustrates the format of an End of Message command packet.

An EOT packet clears the communication path, and sets the bit corresponding to the port number in both the Input Message Ready processor register and the Input Transmission Ready processor register. If enabled, an Input Ready interrupt occurs.

Figure 12:
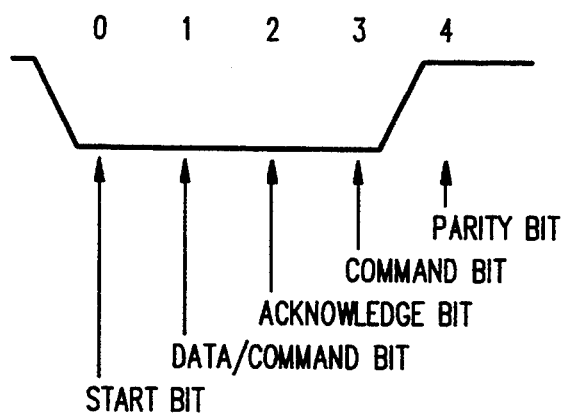
FIG. 12 illustrates the format of an End of Transmission (EOT) command packet.
Figure 13:
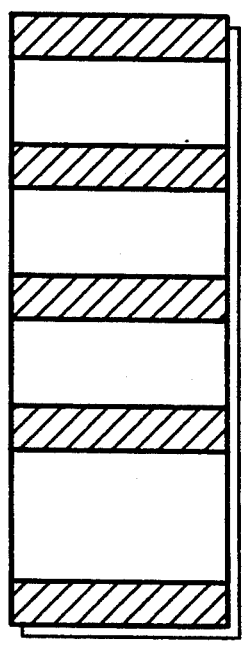
FIG. 13 illustrates the Transmission Format; of a transmission consisting of multiple messages.

FIG. 12 illustrates the format of an End of Transmission (EOT) command packet.

Each address, data, EOM, or EOT packet must be acknowledged by the receiving channel before the sending channel will transmit the next packet. This acknowledgment is made either by sending an acknowledgment packet back to the sending channel, or by setting the acknowledge bit in an outgoing data packet. This handshaking between processors ensures that overrun does not occur.

The Message Layer

Messages are the basis of communication among processors. The user provides a message buffer with the data to be sent. The processor hardware breaks the data into packets for transmission. When all of the data in the buffer has been transmitted, the processor generates and sends an EOM or EOT packet, depending on whether an LPCNT or an LCNT instruction, respectively, was used to begin the transmission. An EOM packet keeps the transmission path open for additional messages. An EOT packet closes the path.

Message Format

Any number of messages can be sent within a given transmission. A transmission consists of an address packet, followed by 0 or more messages separated by EOM packets, followed by the final message and an EOT packet. The address packet sets up a path which remains intact until an EOT packet is encountered. The EOM and EOT packets cause the system of the destination node to set the appropriate bits in the Input Message Ready, Output Message Ready, Input Transmission Ready and Output Transmission Ready Registers (Processor Registers 6, 7, 22, and 23) as shown in FIG. 14, and interrupt its CPU.

Port Interrupts

There are three types of port interrupts: Input Ready interrupts, Output Ready interrupts, and Input Error interrupts.

Input Ready interrupts

Input Ready interrupts are enabled by four conditions, all of which must be true for the interrupt to take place: (1) The Global Interrupt Enable bit in the Program Status Word (PSW) must be 1 (This condition is typically always true.); (2) The Enable Input Interrupt bit in the PSW must be 1 (This condition is also typically always true); (3) The Input Interrupt Enable Register bit corresponding to the port in question must be 1 (Typically, the user's program should arm the interrupt by placing a 1 in the appropriate bit after doing an LCNT or an LPCNT); (4) The Input Message Ready flag corresponding to the port in question must be 1. (LCNT or LPCNT clears this condition. It remains clear until the program reaches an EOM or EOT.)

To service an Input Ready interrupt, the user must do one of two things: (1) Give the port more work to do by clearing the Input Message Ready flag with an LCNT or an LPCNT or (2) Disable the interrupt by writing a 0 into the Input Interrupt Enable Register bit corresponding to the port in question.

Figure 18:
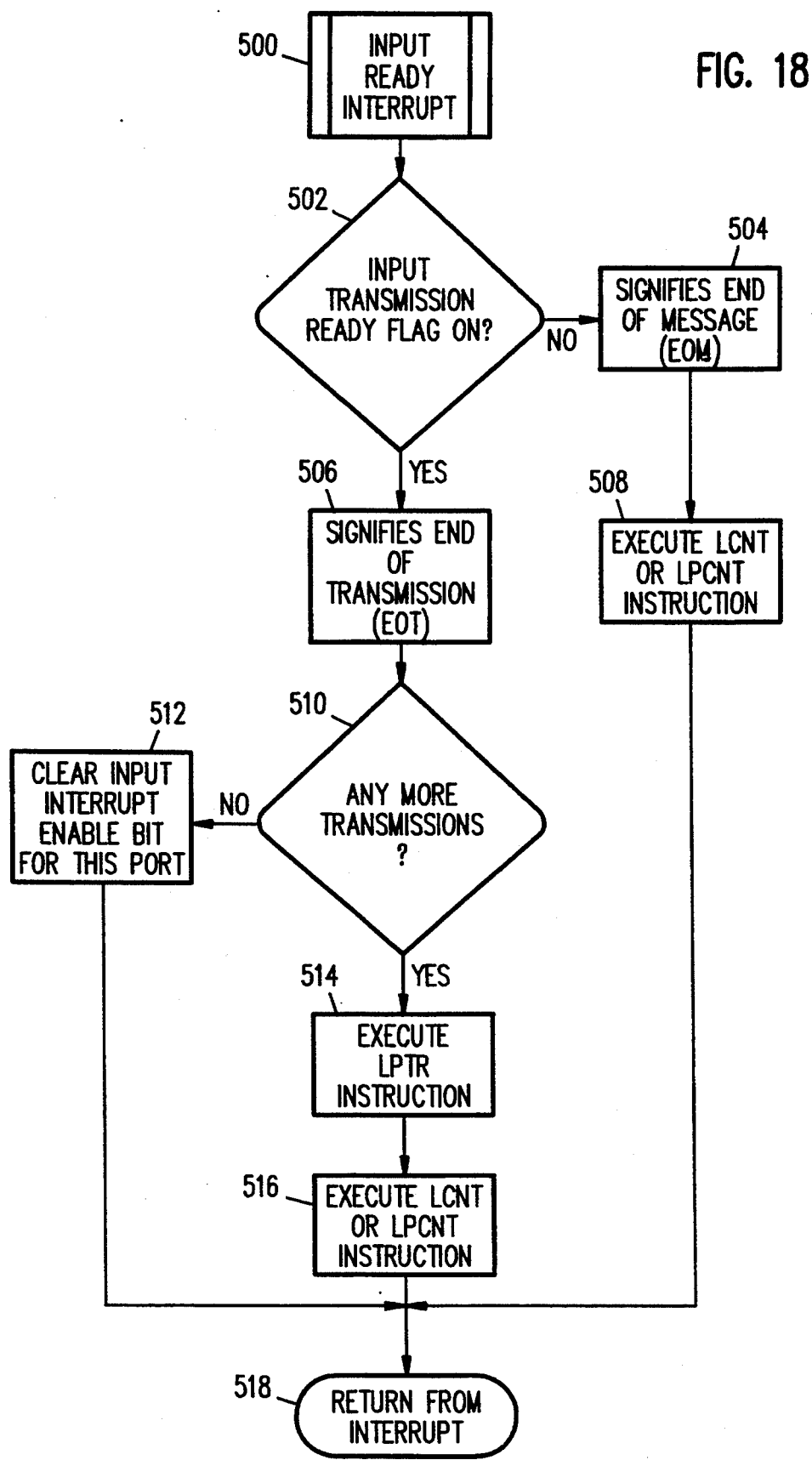
FIG. 18 is a flow diagram of an input ready interrupt subroutine.

Typically, Input Ready Interrupt handling uses the procedure shown in FIG. 18:

Check the Input Transmission Ready flag to see if it is on (502). If no (0), the interrupt is caused by an EOM (504). If yes (1), the interrupt is caused by an EOT (506).

If the flag is 0 (EOM), execute an LCNT or LPCNT instruction (508) and return from the interrupt (518).

If the flag is 1 (EOT), check the data structure to see if there are any more transmissions (510). if yes, execute an LPTR instruction (514), execute an LCNT or LPCNT instruction (516) and return from interrupt (518). If the decision (510) is no, clear the Input Interrupt Enable Register bit corresponding to the port in question (512) and return from interrupt (518).

Output Ready interrupts

Output Ready interrupts are enabled by four conditions, all of which must be true for the interrupt to take place: (1) The Global Interrupt Enable bit in the PSW must be 1 (This condition is typically always true); (2) The Enable Output Interrupt bit in the PSW must be 1 (This condition is also typically always true) (3) The Output Interrupt Enable Register bit corresponding to the port in question must be 1 (Typically, the user's program should arm the interrupt by placing a 1 in the appropriate bit after doing an LCNT or an LPCNT) (4) The Output Message Ready flag corresponding to the port in question must be 1 (LCNT or LPCNT clears this condition. It remains clear until the program reaches an EOM or EOT.)

To service an Output Ready interrupt, the user do one of two things: (1) Give the port more work to do by clearing the Output Message Ready flag with an LCNT or an LPCNT or (2) Disable the interrupt by writing a 0 into the Output Interrupt Enable Register bit corresponding to the port in question.

Figure 19:
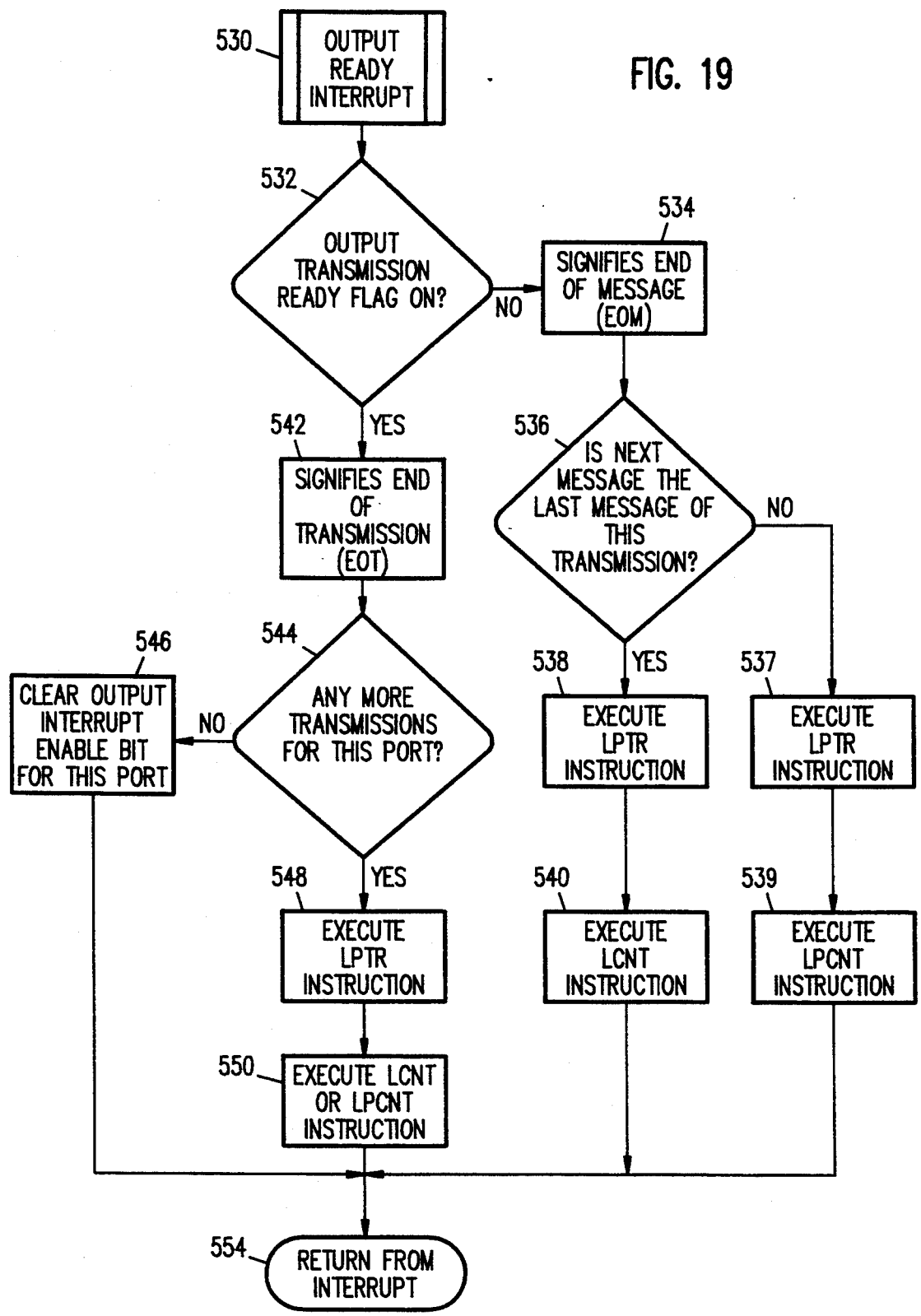
FIG. 19 is a flow diagram of an output ready interrupt subroutine.

Typically, Output Ready Interrupt handling uses the procedure shown in FIG. 19:

Check the Output Transmission Ready flag to see if it is on (532). If no (0), the interrupt is caused by an EOM (534). If yes (1), the interrupt is caused by an EOT (542).

If the flag is 0 (EOM), look at the data structure to see if the next message is the last message of the transmission (536). If yes, execute an LPTR (538), execute an LCNT (540) and return from interrupt (554).

If the decision (536) is no, execute an LPTR (537), execute an LPCNT (539) and return from interrupt (554).

If the output transmission ready flag is on (1) this signifies end of transmission (542). Check the data structure to see if there are any more transmissions scheduled for this port (544). If yes, execute an LPTR instruction (548), execute an LCNT or LPCNT instruction (550) and return from interrupt (554).

If decision (554) is no, clear the Output Interrupt Enable Register bit corresponding to the port in question (546) and return from interrupt (554).

Input Error interrupts

Input Error interrupts occur instead of Input Ready interrupts when a parity error is detected in the last message. The user can respond to an Input Error interrupt in one of two ways:

Post error status and treat like an Input Ready interrupt. ( Essentially ignoring the error.)

Post error status, and dump the rest of the transmission.

Message Structure

A transmission can consist of one or more messages. The first message must contain the 32-bit destination address word, and the last message must be sent using the LCNT instruction to generate an EOT packet. Intermediate messages must be sent using the LPCNT command to generate EOM packets. The 32-bit destination address sets up the communication path. See FIG. 5 for details of the structure of the 32-bit destination address word.

A transmission consisting of a single message is initiated with the LCNT instruction, as shown in FIG. 14.

A transmission consisting of multiple messages, each initiated with the LPCNT instruction, as shown in FIG. 15.

Sending a Message

Figure 20:
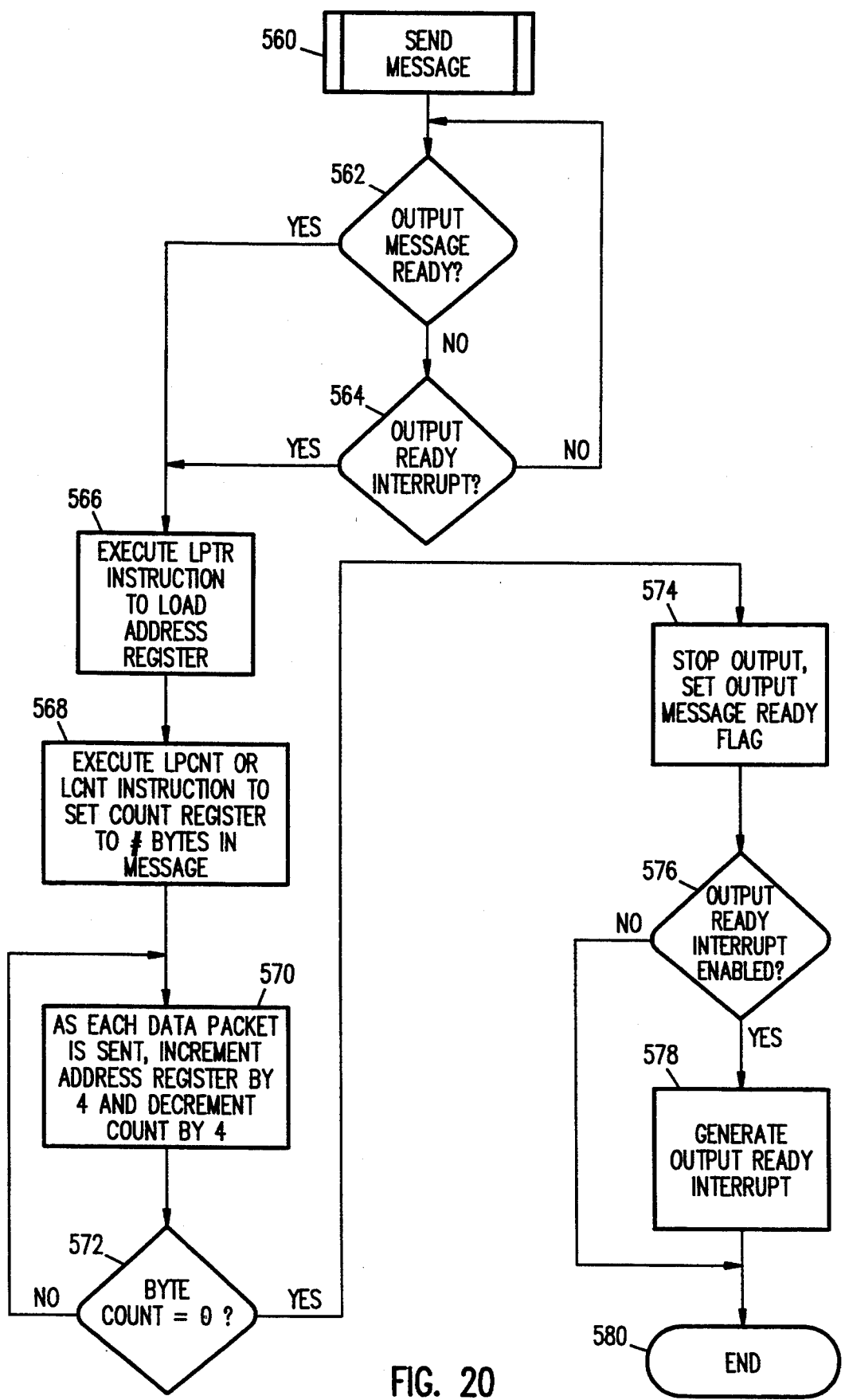
FIG. 20 is a flow diagram of a send message subroutine.

Referring now to FIG. 20, to send a message from a memory buffer via a given output channel the user must do the following.

Check for the channel being ready either by reading the Output Message Ready Register, or by enabling interrupts and using the Output Ready interrupt to signal the condition.

As soon as the channel is ready (block 562 or 564 is "yes"), load its address register by executing a LPTR (Load Pointer) instruction (566). The source operand of this instruction is the word-aligned byte address of the message buffer. The destination operand is an integer whose value determines which channel's address register is loaded.

In order to start the automatic message output, set the corresponding count register to the number of bytes in the message (568). This is done using the LPCNT or LCNT instruction. The destination operand indicates the port to be loaded and the source operand is the count value (an unsigned 32-bit integer). The LPCNT or LCNT also resets the parity flag when setting up an input port.

Message transmission is automatic, and as each data packet is sent, the address register is incremented by four and the count is decremented by four (570). When the count becomes zero (572), the output is stopped (574), the Output Message Ready flag is set, and if enabled (576) the Output Ready interrupt is generated (578).

The two low-order bits are forced to zero in both address and count registers; thus, the message buffer must start on a word boundary and the length must be rounded up to the next word count. No error is signalled if a program violates this requirement.

Receiving a Message

Referring now to FIG. 21, to receive a message into a memory buffer from a given input channel, the user must do the following:

Check that the channel is ready (602). If yes, load the address by executing the LPTR instruction (604). Load a byte count (610). The input channel does not have a count register so the byte count given for LPCNT or LCNT is ignored. The user can use either LPCNT or LCNT to set up the channel, but one or the other must be used (610).

The two low-order bits are forced to zero in both address and count registers (612); thus, the message buffer must start on a word boundary and the length must be rounded up to the next word count. No error is signalled if a program violates this requirement.

As each message is received, the address register is incremented by four (614). Each received message is checked (618) to see if it is an end of transmission (EOT) packet (618). If the EOT decision (618) is no, then the message is checked to see if it is an end of message packet (620). This loop repeats until an EOT is received.

If an end of transmission (EOT message is received, decision (618) is yes, then the input is stopped and the input message ready flag is set (622). The input ready interrupt is checked (624) and if set, an input ready interrupt is generated (626) and the receive operation ends (628).

Registers

Two types of registers keep track of the state of each port: processor registers and DMA registers. Processor registers are visible to the user. DMA registers are not visible, but the user can initialize them.

Each processor register contains a specific type of flag. For example, a given processor's Input Message Ready Register contains 14 Input Message Ready flags, one Input Message Ready flag (187) for each of the 14 ports on the processor.

Processor registers can be broken into two groups: input port processor registers and output port processor registers. The input port processor registers are:
  Input Message Ready Register
  Input Transmission Ready Register
  Input Parity Error Register
  Input Message Pending Register
  Input Interrupt Enable Register
The output port processor registers are:
  Output Message Ready Register
  Output Transmission Ready Register
  Output Receiver Ready Register
  Output Interrupt Enable Register DMA registers are divided into two types: address registers (input address pointers and output address pointers), and count registers (output byte counters). An address register is twenty-six bits long, and contains the starting address of the section of memory that is to be accessed through a DMA transfer. A count register (172) contains the number of bytes, (a multiple of four), to transfer. Note that, because the count register only deals with multiples of four bytes, the last two bits of the count register must always be 00. The count register decrements by four each time a data packet is sent out of the port. When the count reaches 0, the port is ready to send the next message. The input port does not have a count register, but depends on the message ending with an End of Message (EOM) or End of Transmission (EOT) packet to set the Input Message Ready flag (187) which signals an interrupt Each input channel (port) has one DMA register associated with it, an Address Register (168), containing the address pointer to the memory buffer to which received data are stored. This register increments by four.

Each output channel (port) has two DMA registers associated with it an Address Register (170) containing the address pointer to the memory buffer from which transmitted data are fetched (this register increments by four) and a Count Register (172), containing the byte count of the transmitted data (this register decrements by four).

Timing

All messages are sent serially from node to node in packets of 32 data bits. The time it takes one packet to be transferred between two adjacent nodes depends on the port speed, in machine cycles. A machine cycle is two external clock cycles. The transit time for a message packet (Tpacket) is calculated by the following formula:

$$Tpacket = 36 \times (4 - port\ speed)$$

Wherein "port speed" is the port speed of the slowest link in the communication path. The various times are shown in table IV:

TABLE IV

| PORT SPEED | PACKET TRANSFER TIME (Tpacket) |
|---|---|
| 3 (Fastest) | 36 |
| 2 | 72 |
| 1 | 108 |
| 0 (Slowest) | 144 |

The time that it takes a full message of several packets to be sent from one node to another node can be broken into two components: the path initialization time T1, and the data transfer time T2. For example, FIG. 16 illustrates a message path in a dimension 3 hypercube.

Figure 16:
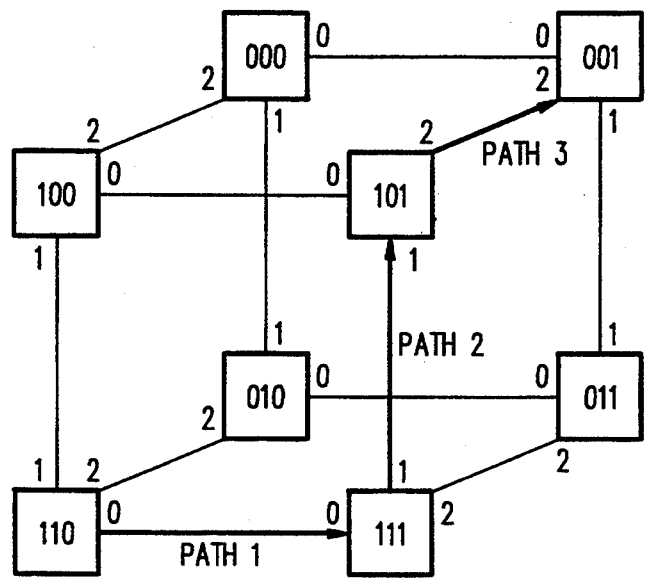
FIG. 16 illustrates a message path in a dimension 3 hypercube.
Figure 17:
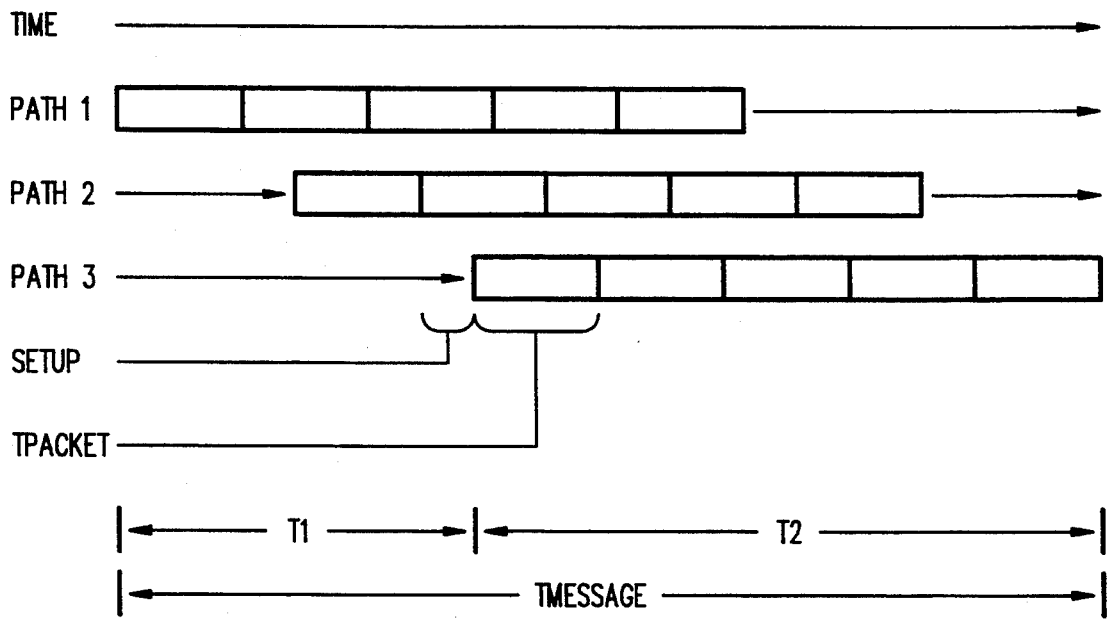
FIG. 17 illustrates how to calculate the time it takes a full message of several packets to be sent from node 110 to node 001 in the hypercube of FIG. 16.

Refer to FIG. 17 which illustrates how to calculate the time it takes a full message of several packets to be sent from source node 110 to destination node 001 in the hypercube of FIG. 16. The actual times may be greater due to memory and path contention. The setup time is 8 cycles.

The times T1 and T2 are calculated as follows:

$$T1 = (dim - 1) \times (Tpacket + setup)$$

$$T2 = (bytes/4) \times (Tpacket)$$

Wherein "dim" is the number of interconnects between the source node and the destination node, "bytes" is the message length and "port speed" is the port speed of the slowest link in the communication path. The total time it takes a full message to be sent from source node to destination node (Tmessage) is therefore T1+T2.

While the invention has been particularly shown and described with reference to preferred embodiments thereof, it will be understood by those skilled in the art that the foregoing and other changes in form and detail may be made therein without departing from the spirit and scope of the invention.

We claim:
1. In a network of interconnected nodes;
   each node including a processor (10, 12, 14, 16, 18);
   each processor including means for internode communication, said internode communication means connecting said nodes to form an array of said processors having a hypercube topology;

each of said processors in said network being assigned a unique processor identification (ID), said ID being comprised of bit 1, bit 2 . . . bit n, bit n+1, bit n+2, . . . ;

the processor IDs of two processors connected to each other through port number n, varying only in said bit n;

a first node of said nodes having an output port n;

an apparatus in a second node of said nodes for establishing a communication path through said second node comprising:

a plurality of input ports, one of said input ports being input port n;

a plurality of output ports;

receiving means (200) at said input port n for receiving a first address packet related to a first message from said output port n of said first node;

said first address packet including a forward bit set to one of either a first state or a second state, said first address packet being immediately followed by a second address packet;

a data bus (210);

said data bus connecting said input and output ports of said second node together such that messages received on any one input pod can be routed to any other output port of said second node;

registering means (202) for registering a processor ID unique to said second node;

comparing means (204) connected to said data bus, to said receiving means (200) and to said registering means (202) for comparing a first node address in said first address packet with each corresponding bit position, successively, beginning with said bit n+1 of said processor ID of said second node stored in said registering means to determine a first one bit position of said first node address in said first address packet that is not the same as a corresponding bit position of said processor ID of said second node;

said comparing means (204) including means for activating for transmission of said first address packet placed on said data bus (210) by said input port n, the one of said plurality of output ports whose port number corresponds to said first one bit position, where n is the number of said input port n;

forward bit detection means for detecting that said forward bit is set to said first state;

means connected to said forward bit detection means for discarding said first node address in said first address packet;

said compare logic (204) including means for comparing a second node address in said second address packet following said first address packet with each corresponding bit position, successively, beginning with a bit n+1, of the processor ID of said second node to determine a second bit position of said second node address in said second address packet that is not the same as a corresponding bit position of said processor ID of said second node; and, means for sending said second address packet out of the port number of said second node corresponding to said second one bit position where n is the number of a port on which said first address packet is received.

2. The combination in accordance with claim 1 wherein:

said second node includes a local memory (20) having a memory data bus (156) for receiving data to be stored in said local memory;

said output ports are connected to said memory data bus; and, said comparing means (204) includes first detection means for detecting that said node address in said first address packet and said processor ID of said second node are the same; and, transferring means connected to said detection means for transferring said first message to said local memory (20) of said second node.

3. The combination in accordance with claim 1 wherein:

said receiving means (200) further includes receiving means for receiving a second address packet related to a second message from an output port of a second of said interconnected nodes;

said compare logic (204) includes second detection means for detecting that said second address packet specifies the same port as said first address packet, and, blocking means connected to said second detection means for blocking, at said second node, said second address packet;

said receiving means (200) includes means for generating an end of transmission (EOT) signal upon receipt of an end of transmission (EOT) message; and, said compare logic (204) includes means responsive to said end of transmission (EOT) signal for deactivating said blocking means.

4. In a network of interconnected nodes;

each node including a processor (10, 12, 14, 16, 18);

each of said processors in said network being assigned a unique processor identification (ID), said ID being comprised of bit 1, bit 2 . . . bit n, bit n+1, bit n+2 . . . ;

the processor IDs of two processors connected to each other through port number n, varying only in said bit n;

each processor including means for internode communication, said internode communication means connecting said nodes to form an array of said processors having a hypercube topology;

a method of establishing a communication path through a node of said network comprising the steps of:

A. receiving a first address packet related to a first message from an output port of a first of said nodes at an input port n of a second of said nodes, said first address packet including a forward bit set to one of either a first state or a second state, said first address packet being immediately followed by a second address packet;

B. comparing at said second node a node address in said first address packet with each corresponding bit position, successively, beginning with said bit n+1 of a processor ID of said second node to determine a first bit position of said node address in said first address packet that is not the same as a corresponding bit position of said processor ID of said second node;

C. sending said first address packet out of an output port of said second node, said output port of said second node having a port number corresponding to said first bit position, starting at bit n+1, where n is the number of an input port said second node on which said first address packet is received;

D. detecting that said forward bit is set to said first state;

E. discarding said first address, in said first address packet in response to said detecting that said forward bit is set to said first state;

F. comparing a node address in said second address packet with each corresponding bit position, successively beginning with said bit n+1, of the processor ID of said second node to determine a a second one bit position of said node address in said second address packet that is not the same as a corresponding bit position of the processor ID of said second node; and, G. sending said second address packet out of the port number of said second node corresponding to said second one bit position wherein n is the number of the port on which said first address packet was received.

5. The method in accordance with claim 4 wherein said first address packet includes a Forward bit set to one of either a first state or a second state, said first address packet being immediately followed by a second address packet, further comprising the steps of:

H. detecting a condition that said first node address in said first address packet and said processor ID of said second node are the same; and, I. transferring said first address packet to a local memory of said second node in response to said condition that said node address in said first address packet and said processor ID of said second node are the same.

6. The method in accordance with claim 4 wherein step C includes the step of sending said first address packet out of an output port which has a number higher than an input port on which said first address packet is received.

7. The method in accordance with claim 4 further comprising the steps of:

H. detecting that said second address packet specifies a port number that is identical to a port number specified in said first address packet, I. blocking, at said second node, said second address packet; and, J. unblocking, at said second node, said second address packet upon receipt of an end of transmission (EOT) packet that specifies said second address packet.

* * * * *